(12) United States Patent
Simard-Lecours et al.

(10) Patent No.: US 11,448,623 B2
(45) Date of Patent: Sep. 20, 2022

(54) VALVE ASSEMBLY FOR A GAS CHROMATOGRAPH

(71) Applicant: LDETEK INC., Thetford Mines (CA)

(72) Inventors: Xavier Simard-Lecours, Levis (CA); Dany Gagne, Thetford Mines (CA); Louis Paradis, Thetford Mines (CA)

(73) Assignee: LDetek inc., Thetford Mines (CA)

( * ) Notice: Subject to any disclaimer, the term of this patent is extended or adjusted under 35 U.S.C. 154(b) by 326 days.

(21) Appl. No.: 16/914,292

(22) Filed: Jun. 27, 2020

(65) Prior Publication Data

US 2020/0326316 A1  Oct. 15, 2020

Related U.S. Application Data

(63) Continuation of application No. PCT/CA2019/050084, filed on Jan. 23, 2019.

(60) Provisional application No. 62/620,843, filed on Jan. 23, 2018.

(51) Int. Cl.
| | |
|---|---|
| *G01N 30/32* | (2006.01) |
| *F16K 1/36* | (2006.01) |
| *F16K 1/46* | (2006.01) |
| *F16K 11/22* | (2006.01) |
| *F16K 31/122* | (2006.01) |
| *F16K 11/02* | (2006.01) |
| *G01N 30/02* | (2006.01) |

(52) U.S. Cl.
CPC .............. *G01N 30/32* (2013.01); *F16K 1/36* (2013.01); *F16K 1/46* (2013.01); *F16K 11/022* (2013.01); *F16K 11/22* (2013.01); *F16K 31/1221* (2013.01); *G01N 2030/025* (2013.01); *G01N 2030/328* (2013.01)

(58) Field of Classification Search
CPC .. G01N 30/32; F16K 1/36; F16K 1/46; F16K 11/022; F16K 11/22; F16K 31/1221
See application file for complete search history.

(56) References Cited

U.S. PATENT DOCUMENTS

| | | | |
|---|---|---|---|
| 2,943,223 | A | 6/1960 | Fay |
| 3,032,654 | A | 5/1962 | Fay et al. |
| 3,111,849 | A | 11/1963 | Broerman |
| 3,549,326 | A | 12/1970 | Dahlquist et al. |
| 4,167,334 | A | 9/1979 | Phillips |
| 4,740,695 | A | 4/1988 | Simpson |
| 4,806,315 | A | 2/1989 | Daigle |
| 5,083,004 | A | 1/1992 | Wells et al. |
| 5,153,519 | A | 10/1992 | Wentworth et al. |

(Continued)

FOREIGN PATENT DOCUMENTS

| | | |
|---|---|---|
| GB | 2344655 A | 6/2000 |
| WO | 2019144228 A1 | 8/2019 |

*Primary Examiner* — Kevin R Barss
(74) *Attorney, Agent, or Firm* — Fasken Martineau Dumoulin, LLP

(57) ABSTRACT

The valve assembly includes a main valve body defining a first inner cylindrical cavity, a support plate positioned above the main valve body, and an upper valve head positioned above the support plate. The upper valve head includes a bottom planar bottom surface and a plurality of discrete conduits, each conduit extending between an outer end and an inner end. The valve assembly further includes a sealing diaphragm interposed between the support plate and the upper valve head. The diaphragm can be engaged by plungers to selectively open or close corresponding gas circuits.

20 Claims, 20 Drawing Sheets

(56) References Cited

U.S. PATENT DOCUMENTS

| | | |
|---|---|---|
| 5,153,673 A | 10/1992 | Amirav |
| 5,218,203 A | 6/1993 | Eisele et al. |
| 5,394,092 A | 2/1995 | Wentworth et al. |
| 5,541,519 A | 7/1996 | Stearns et al. |
| 5,570,179 A | 10/1996 | Weckstrom |
| 5,594,346 A | 1/1997 | Stearns et al. |
| 5,601,115 A | 2/1997 | Broerman |
| 5,611,846 A | 3/1997 | Overton et al. |
| 5,612,489 A | 3/1997 | Ragsdale et al. |
| 6,202,698 B1 | 3/2001 | Stearns |
| 6,432,064 B1 | 8/2002 | Hibner et al. |
| 6,490,910 B1 | 12/2002 | Butler et al. |
| 6,682,638 B1 | 1/2004 | Prohaska et al. |
| 6,691,552 B2 | 2/2004 | Cardelius |
| 6,932,941 B2 | 8/2005 | Prohaska et al. |
| 7,013,707 B2 | 3/2006 | Prohaska et al. |
| 7,448,904 B2 | 11/2008 | Lemke et al. |
| 7,456,394 B2 | 11/2008 | Cameron et al. |
| 7,493,795 B2 | 2/2009 | Komura et al. |
| 7,586,092 B1 | 9/2009 | Karpetsky |
| 7,614,305 B2 | 11/2009 | Yoshioka et al. |
| 7,735,352 B2 | 6/2010 | Alm et al. |
| 7,736,908 B2 | 6/2010 | Prohaska et al. |
| 7,745,038 B2 | 6/2010 | Yoshioka et al. |
| 7,812,614 B2 | 10/2010 | Kurita et al. |
| 7,824,471 B2 | 11/2010 | Gamache et al. |
| 7,902,498 B2 | 3/2011 | Miller et al. |
| 7,931,043 B2 | 4/2011 | Gamache et al. |
| 8,104,506 B2 | 1/2012 | Gamache et al. |
| 8,123,396 B1 | 2/2012 | Karpetsky et al. |
| 8,237,110 B2 | 8/2012 | Peng et al. |
| 8,239,171 B2 | 8/2012 | Gamache et al. |
| 8,315,400 B2 | 11/2012 | Goldstein et al. |
| 8,794,594 B2 | 8/2014 | Gamache et al. |
| 8,807,164 B2 | 8/2014 | Baier et al. |
| 8,851,452 B2 | 10/2014 | Gamache et al. |
| 8,882,894 B2 | 11/2014 | Pelagatti et al. |
| 9,005,383 B2 | 4/2015 | Wada et al. |
| 9,015,930 B2 | 4/2015 | Maeda et al. |
| 9,229,431 B2 | 1/2016 | Briswalter et al. |
| 9,263,845 B2 | 2/2016 | Sukkmann et al. |
| 9,310,308 B2 | 4/2016 | Paradis et al. |
| 9,377,444 B2 | 6/2016 | Gamache |
| 9,435,440 B2 | 9/2016 | Gamache |
| 9,632,065 B2 | 4/2017 | Gamache |
| 10,126,278 B2 | 11/2018 | Gagne et al. |
| 10,379,054 B2 | 8/2019 | Gamache |
| 2009/0031785 A1 | 2/2009 | Kellner et al. |

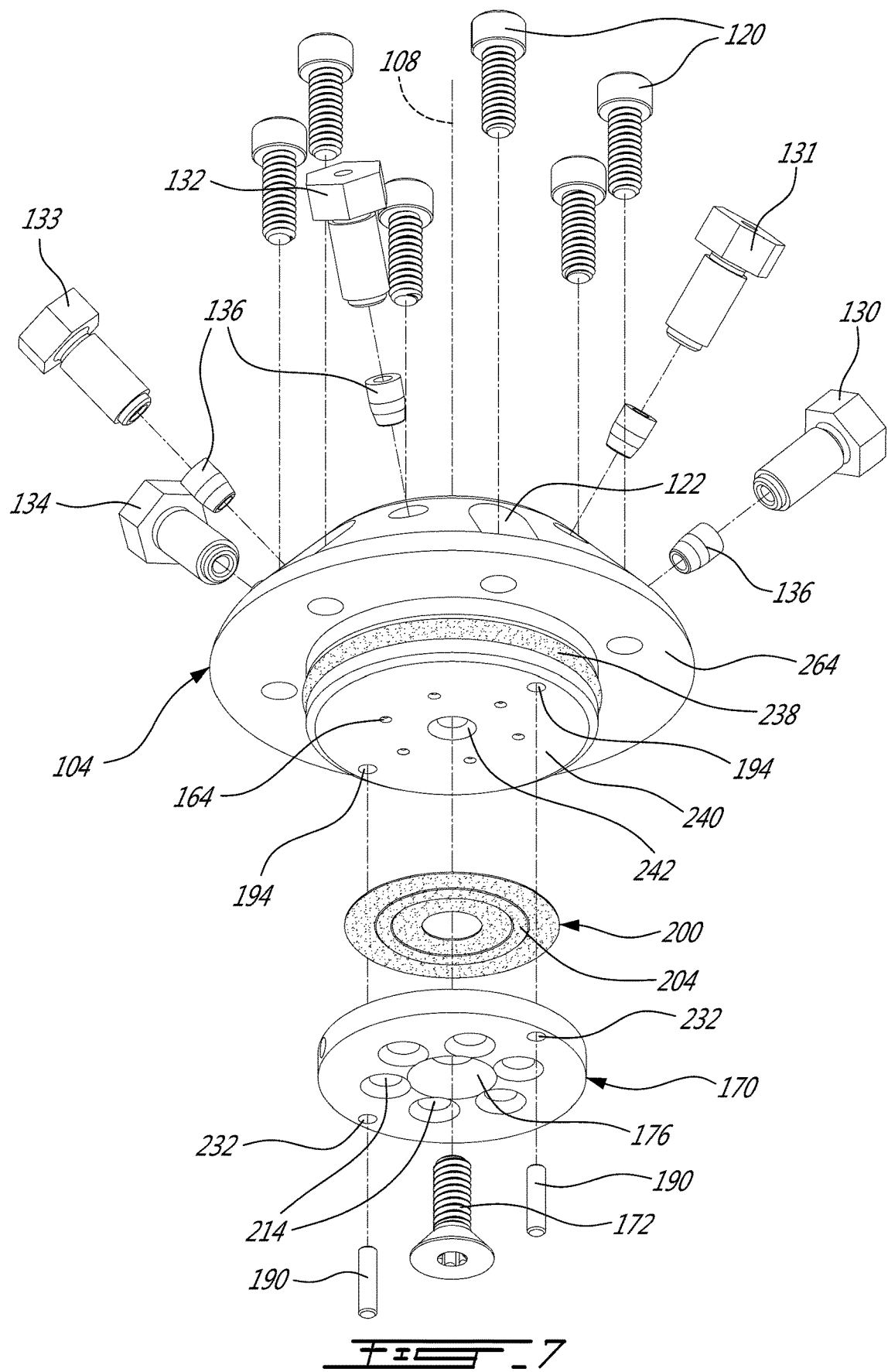

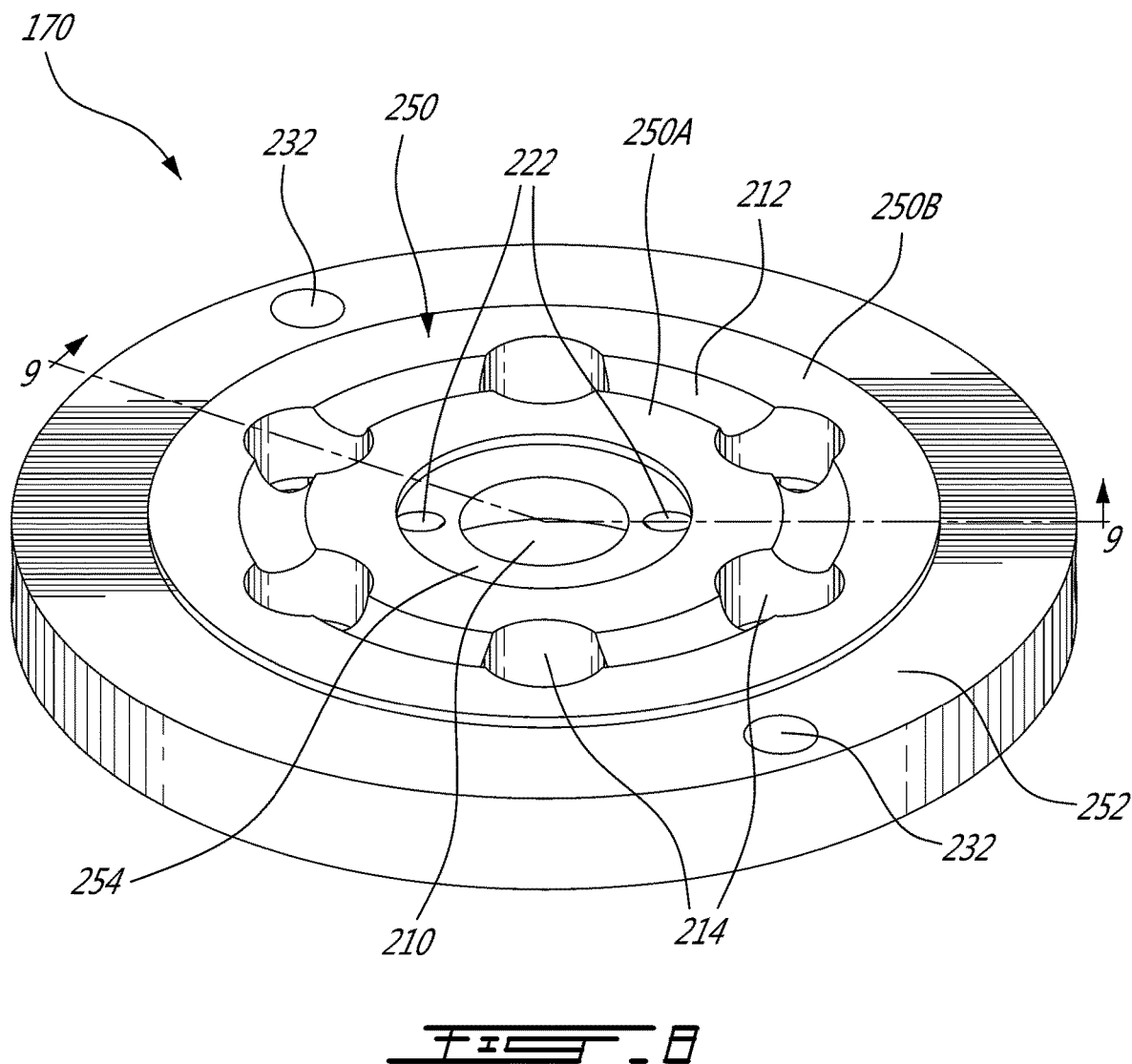
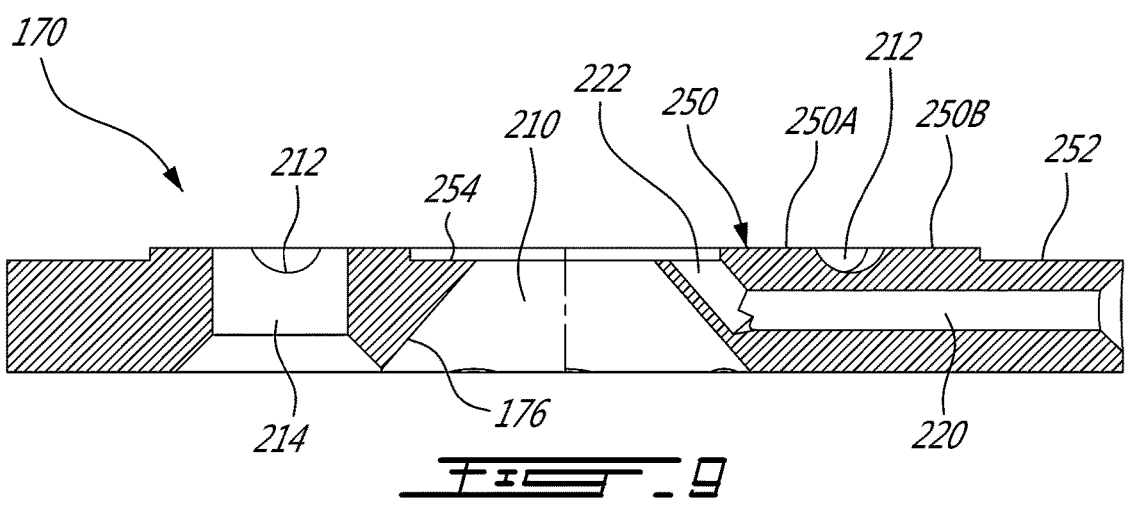

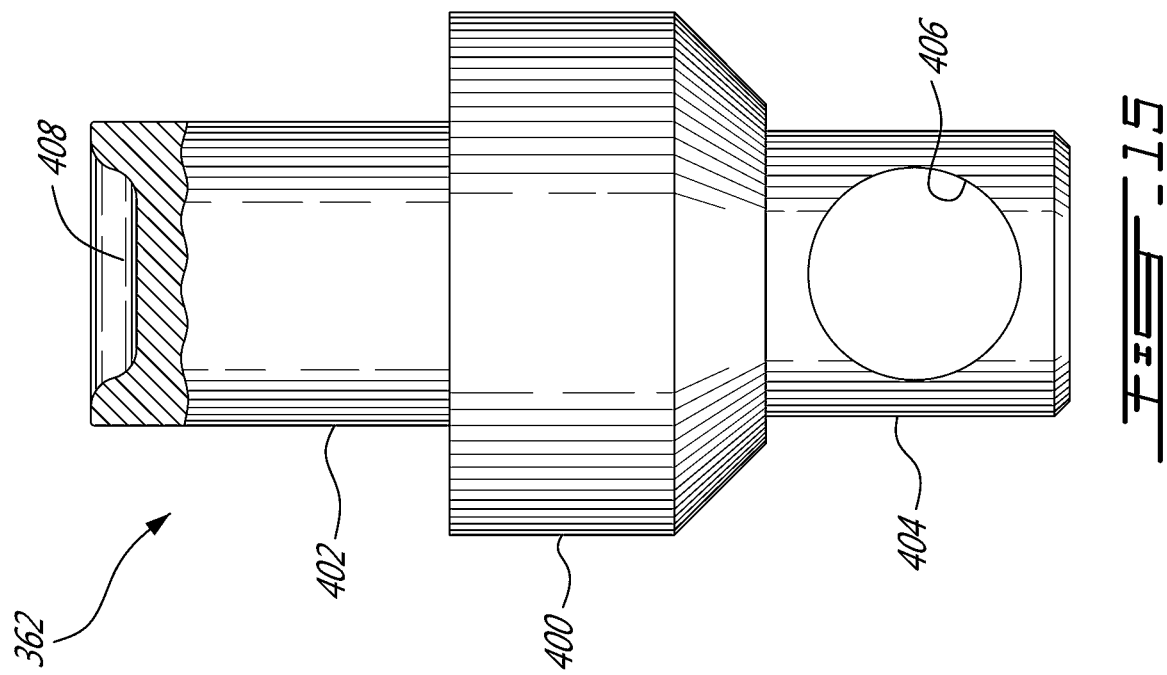
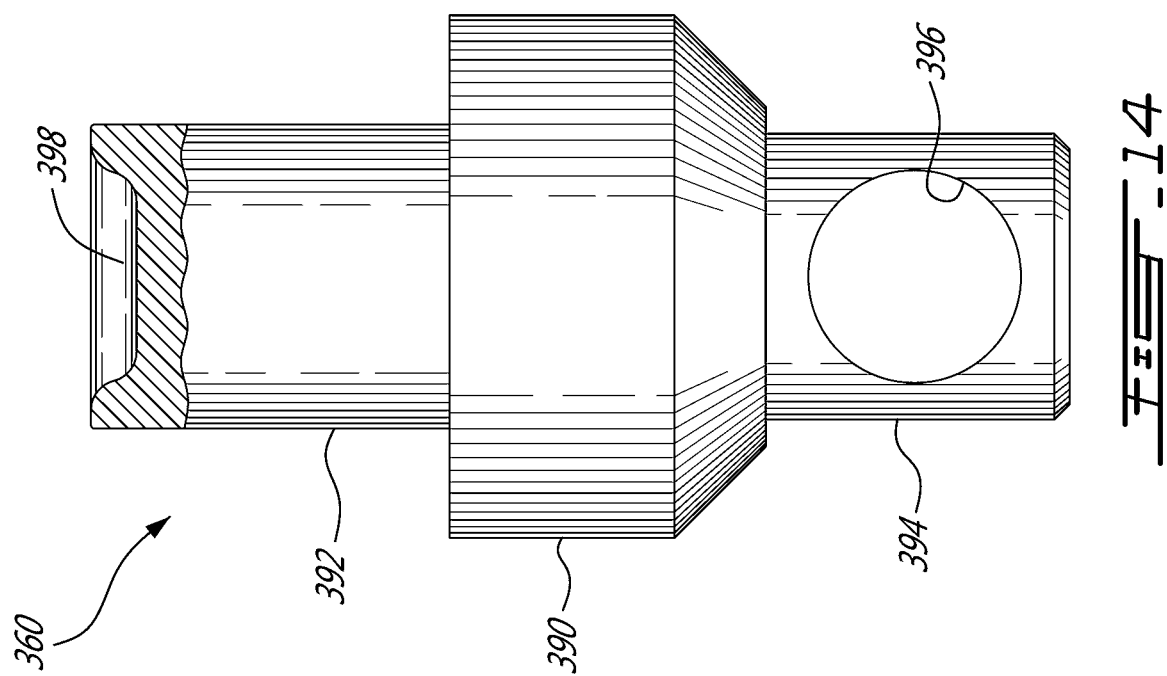

FIG-16

VALVE ASSEMBLY FOR A GAS CHROMATOGRAPH

CROSS REFERENCE TO PRIOR APPLICATIONS

The present case is a continuation of PCT Application No. PCT/CA2019/050084 filed 23 Jan. 2019. PCT/CA2019/050084 claims the benefits of U.S. patent application No. 62/620,843 filed 23 Jan. 2018. The entire contents of these prior patent applications are hereby incorporated by reference.

TECHNICAL FIELD

The technical field relates generally to valve assemblies for use with gas chromatographs.

BACKGROUND

The basic chromatography is the separation of components of a sample owing to their differences in solubility or in adsorption in a stationary bed of a material (either liquid or solid). When the sample (moving phase) is a gas, the technique is referred to as gas-solid or gas-liquid chromatography, depending on whether the stationary phase is a solid or a liquid. In gas chromatography, a sample is introduced into a carrier gas as a vapor which flows through a chromatographic system. Upon separation by the stationary phase, the analytes travel through the gas chromatograph at different speeds and enter a detecting device, which device is connected to the gas chromatograph, at different times. As a result, individual analytes that are present in the sample may be identified by the detecting device.

The analytes are transported using a carrier gas. The carrier gas is an inert gas for the analyte. Argon, helium, and nitrogen are examples of carrier gases. Other gases and mixtures of gases can be used as well, depending on the implementations and/or the requirements.

A same gas chromatograph can be used with different kinds of detecting devices, depending on the needs. The various kinds of detecting devices can themselves have different sensitivity levels. For instance, some detecting devices can be designed to detect very low concentrations of an analyte, such as in the range of parts per million (ppm) or even parts per billion (ppb). Others can be designed to detect concentrations in the range of a few percent or more.

Some detecting devices can measure the concentrations of analytes based on ionization. The carrier gas with the analytes is then directed from the outlet of the gas chromatograph to an ionization chamber located in-between a pair of electrodes inside the detecting device. The detecting device transforms the carrier gas and each analyte into plasma using the electrodes. The plasma results in light radiations, including visible light. The light radiations can be sensed and recorded using one or more corresponding light sensors. The spectral content of the data obtained from the light sensor or sensors can reveal the presence of some analytes and their concentration.

One of the challenges with gas chromatographs is maintaining the integrity of the entire gas circuit network leading to the detecting device. Air leaks into a gas circuit or an accidental mishandling of some of the parts can allow impurities into sections of the gas circuits and irremediably contaminate them. A contamination will alter the measurements, either present or future, thereby making the gas chromatograph completely unusable, particularly when very low concentrations of an analyte must be detected. Among other things, the purity of the gas circuits must be extremely high to detect concentrations in the range of parts per billion (ppb) and having the slightest impurity inside a gas circuit will entail very costly repairs, if not be fatal to the gas chromatograph.

The various gas circuits in a gas chromatograph are generally managed using one or more gas valves. These valves are potential areas where a contamination could occur. In particular, a gas valve for use in a gas chromatograph often includes a sealing diaphragm. One of the functions of the sealing diaphragm is to create a barrier between the highly pure environment of the gas circuits and the rest of the internal parts of the valve, including an actuation mechanism to close and open the various passages between the ends of two adjacent conduits. This actuation mechanism generally includes sets plungers having tips that can selectively move in or out of engagement with corresponding locations on the sealing diaphragm, thereby selectively closing or opening passages on the other side of the sealing diaphragm.

The actuation mechanism is often remotely controlled using a pressurized actuating gas circuit. The pressurized gas comes from an external pressurized gas source. It passes through a regulator and a proper managing device, for instance a pilot valve. One concern is that an inadvertent or accidental overpressure event in the actuating gas circuit is always something possible. This may happen, for instance, in case of a failure of the pressure regulator or as a result of a setting error by a user. An overpressure inside the valve can cause some of the plungers of the actuation mechanism to engage the sealing diaphragm with an excessive force, thereby causing the thin membrane of the sealing diaphragm to be punctured or otherwise damaged. Damaging the sealing diaphragm can allow ambient air and impurities to enter the gas circuits, resulting in a contamination. Even a very brief overpressure event inside a valve actuation mechanism can ruin an entire gas chromatograph.

Another concern is that maintenance operations to be performed can be particularly difficult on many of the gas valves. These maintenance operations can be required, among other things, for replacing the actuation mechanism inside one of these valves or for cleaning parts. Opening the valves often releases the pressure applied on their sealing diaphragm and this increases the risks of contamination. Parts may be mishandled during a maintenance operation once fasteners are untightened or removed, thereby causing the sealing diaphragm to be damaged. Still, parts can be incorrectly reassembled, be misaligned, or one or more of the fasteners may not be properly tightened.

Accordingly, there is a need to provide an improved arrangement which can mitigate or even alleviate the risks of damaging a sealing diaphragm inside a gas valve in case of an overpressure event in the actuating gas circuit controlling the actuation mechanism.

There is also a need to provide an improved arrangement where the sealing diaphragm inside a gas valve is less prone to damages resulting from a mishandling during a maintenance operation or due to errors occurring during reassembly.

SUMMARY

In one aspect, there is provided a valve assembly for a gas chromatograph, the valve assembly including: a main valve body defining a first inner cylindrical cavity coaxially disposed with reference to a central axis; a support plate positioned above the main valve body and including a planar upper surface that is generally normal to the central axis, the planar upper surface having a surface groove circumferentially-disposed about the central axis and an array of holes extending generally parallel to the central axis across the support plate; an upper valve head positioned above the support plate, the upper valve head including a bottom planar bottom surface and a plurality of discrete conduits, each conduit extending between an outer end and an inner end; a sealing diaphragm interposed between the planar upper surface of the support plate and the planar bottom surface of the upper valve head; a first piston positioned inside the first inner cavity to reciprocate, along the central axis and relative to the sealing diaphragm, between at least a bottom position and an upper position, the first piston having a body defining a second inner cylindrical cavity; a second piston positioned inside the second inner cavity of the first piston to reciprocate, along the central axis and relative to the sealing diaphragm, between at least a bottom position and an upper position; a set of normally-closed plungers and a set of normally-opened plungers that are generally extending parallel to the central axis and disposed in a staggered arrangement, the normally-closed plungers being carried by the first piston and the normally-opened plungers being carried by the second piston; an actuating gas circuit extending through the body of the first piston to establish a fluid communication with a space located between a bottom side of the second inner cavity and the second piston; a first force-generating mechanism to urge the first piston towards its upper position; and a second force-generating mechanism to urge the second piston towards its bottom position.

In another aspect, there is provided a valve assembly as described and/or shown and/or suggested herein.

In another aspect, there is provided a method of configuring and/or operating a valve assembly, as described and/or shown and/or suggested herein.

Further details on the various aspects of the proposed concept can be found in the following detailed description and the appended figures.

BRIEF DESCRIPTION OF THE FIGURES

FIG. 7 is a view similar to FIG. 6 but taken from another angle.

FIG. 8 is an enlarged isometric view of the support plate in FIGS. 6 and 7.

FIG. 9 is a cross section view of the support plate taken along line 9-9 in FIG. 8.

FIG. 14 is an enlarged side view of one of the plungers in FIGS. 12 and 13.

FIG. 15 is an enlarged side view of another one of the plungers in FIGS. 12 and 13.

FIG. 16 is an enlarged cutaway view of the actuating unit in FIGS. 10 and 11.

DETAILED DESCRIPTION

Figure 1:
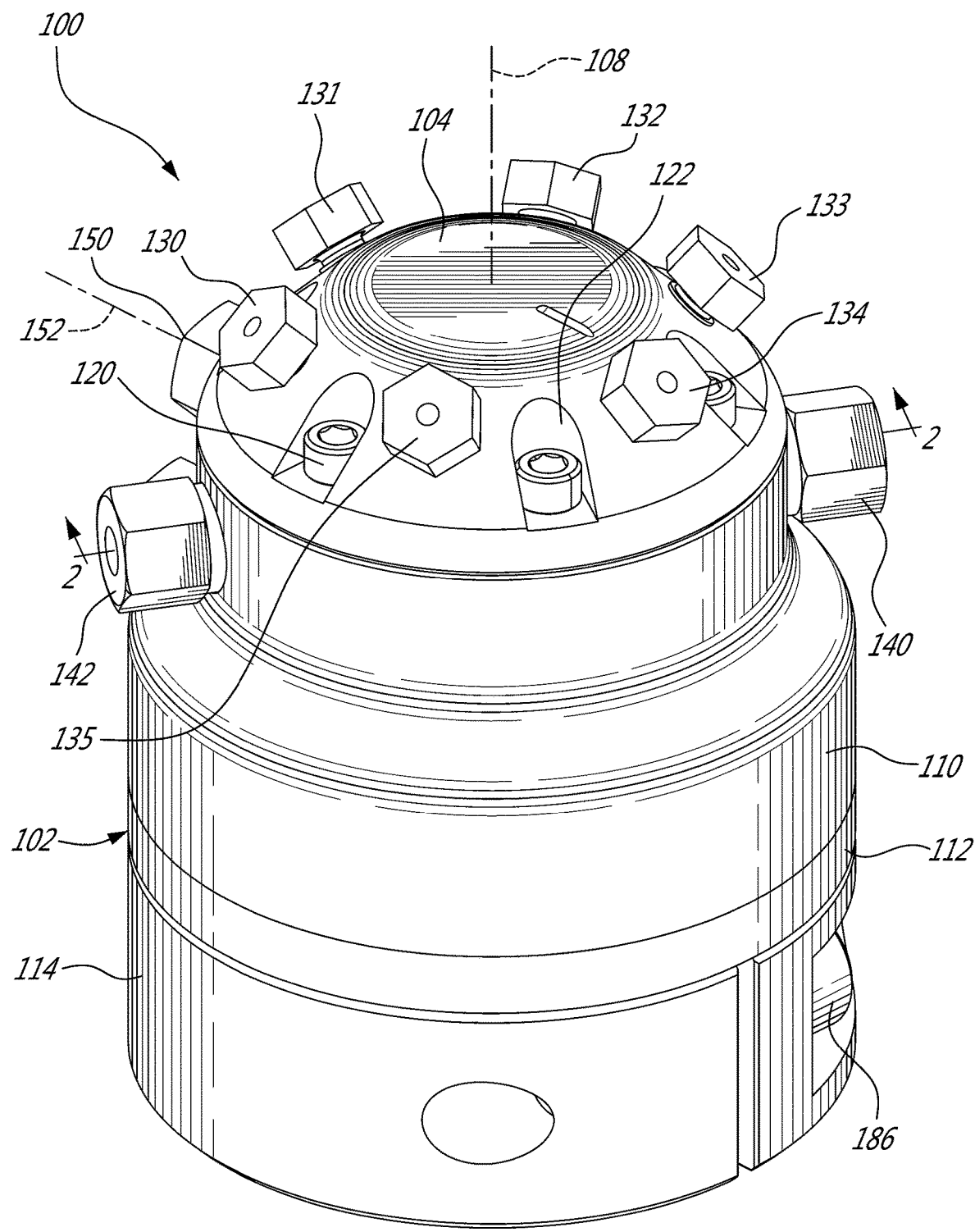
FIG. 1 is an isometric top view illustrating an example of a valve assembly incorporating the proposed concept.

FIG. 1 is an isometric top view illustrating an example of a valve assembly 100 incorporating the proposed concept. This valve assembly 100 is for use with a gas chromatograph. A generic example of a gas chromatograph is shown for instance in U.S. Pat. Publ. Serial No. 2017/0254786 A1 published 7 Sep. 2017, the contents of which are hereby incorporated by reference. Other kinds of gas chromatographs, configurations and arrangements are possible as well. The principle of the gas chromatograph is known to those skilled in the art and does not need to be further discussed herein.

The valve assembly 100 illustrated in FIG. 1 includes a main valve body 102 to which is affixed an upper valve head 104. The upper valve head 104 is positioned generally above the main valve body 102. Various gas circuits are located in the upper valve head 104. These gas circuits can be in fluid communication with one or more detecting devices of a gas chromatograph. The main valve body 102 is primarily provided to support the upper valve head 104 and to hold an internal actuating unit 300 (shown for instance in FIGS. 10 to 13) located inside the valve assembly 100. This illustrated valve assembly 100 has a central axis 108.

The main valve body 102 includes three main parts in the illustrated example, namely a housing 110, a bottom cover 112 and an annular base 114. The housing 110 defines an inner cylindrical cavity 180 (FIG. 11) that is coaxial with the central axis 108 and located in the bottom section of the housing 110 in the illustrated example. Other configurations and arrangements are possible as well.

The main valve body 102 and the upper valve head 104 can be made of the same material. This way, the thermal expansion coefficient can be the same everywhere. Nevertheless, other configurations and arrangements are possible. The material for these parts can be a metal or an alloy having a relatively low thermal expansion coefficient. One possible example is tungsten, where the linear thermal expansion coefficient is about 4.5 microns/meter-Kelvin. Other materials are possible, including stainless steel since its linear thermal expansion coefficient is generally below 10.8 microns/meter-Kelvin, as well as brass or nickel, to name just others. Additional variants are possible as well.

Furthermore, it can be highly desirable that the material for the upper valve head 104 has a minimal surface adsorption and a maximal inertness to alleviate chemical reactions with the gases sent through the gas circuits. If desired, the internal surface that will be in contact with the gases circulating in the gas circuits can be coated with a layer of another material so as to improve the surface inertness. Other approaches can be used in some implementations.

The upper valve head 104 can be removably affixed to the main valve body 102 using a plurality of bolts 120. These bolts 120 can be axisymmetric with reference to the central axis 108, as shown in the illustrated example. The bolts 120 can be inserted into corresponding holes provided around the periphery of the upper valve head 104 and the threaded shanks of these bolts 120 can then be secured into corresponding threaded holes provided on the upper side of the main valve body 102. The bolts 120 are then tightened to maintain a constant minimal holding force between the main valve body 102 and the upper valve head 104. Recesses 122 can be machined or be otherwise created on the upper valve head 104 to receive the head of the bolts 120, as shown in the illustrated example. Other configurations and arrangements are possible. For instance, the number of bolts 120 can be different and other kinds of fasteners can be used in some implementations. Additional variants are possible as well.

The valve assembly 100 illustrated in FIG. 1 includes six gas ports 130, 131, 132, 133, 134, 135 on the upper valve head 104. These ports 130, 131, 132, 133, 134, 135 are connections points to which corresponding gas lines (not shown) can be attached. Each port 130, 131, 132, 133, 134, 135 is the outer end of a corresponding conduit provided inside the upper valve head 104. Each conduit extends between its outer end and an inner end located underneath the upper valve head 104. These conduits are discrete, thus are not in fluid communication with one another along their length. Each conduit can only be in fluid communication with a single one of its two immediately adjacent conduits at a time and this fluid communication is only selectively established through a corresponding passage between their inner ends.

FIG. 1 shows that each of the ports 130, 131, 132, 133, 134, 135 can include a fitting partially extending out of the upper valve head 104, as shown in the illustrated example. Each of these fittings includes a threaded shank inserted into a corresponding obliquely-oriented threaded socket machined or otherwise created into the upper valve head 104. Each fitting also includes a central hole to which a corresponding tube or the like can be inserted. The tip of each threaded shank can engage a corresponding ferrule 136 (see for instance FIGS. 6 and 7) inserted at the bottom of the socket to seal the junction with the tube that will be inserted inside the fitting. The fittings can be made of a material that offers good thermal insulation characteristics, such as Teflon™, polyoxymethylene (Derlin™) or borosilicate, to name just a few. Other materials are possible and at least some of the above-mentioned features can be omitted in some implementations, including the fittings. Other configurations and arrangements are possible as well.

In use, there are only three possible settings for the illustrated valve assembly 100, namely: (1) a first set of three discrete gas circuits is created inside the valve assembly 100 using three pairs of adjacent conduits; (2) no gas circuit exists because all passages are blocked between any one of the inner ends of the conduits; and (3) a second set of three discrete gas circuits is created inside the valve assembly 100 using three pairs of adjacent conduits where none of the conduits is paired with the same adjacent conduit as in the first set. In the illustrated example, the first set of gas circuits can include a first gas circuit extending between port 130 and port 131, a second gas circuit extending between port 132 and port 133, and a third gas circuit extending between port 134 and port 135. The second set of gas circuits would then include a first gas circuit extending between port 130 and port 135, a second gas circuit extending between port 131 and port 132; and a third gas circuit extending between port 133 and port 134. Variants are possible in other implementations.

The exact number of ports/conduits can be different from one implementation to another as long as the number is a multiple of two. For instance, in an implementation where a valve assembly includes twelve conduits (thus twelve ports), such valve assembly will still have only three possible settings, but each set of gas circuits will include six discrete gas circuits.

In use, the transitions between the setting establishing the first set of gas circuits and the setting establishing the second set of gas circuits always involve going through the setting where no gas circuit exists. There is never any overlap between the two settings establishing the gas circuits. The gas circuits in each set are also closed and opened at the same time. In the illustrated example, the three gas circuits in the first set of gas circuits are closed and opened simultaneously, and the three gas circuits in the second set of gas circuits are closed and opened simultaneously.

The valve assembly 100 can further include two opposite gas ports 140, 142. These parts 140, 142 can radially extend through the sidewall of the housing 110 of the main valve body 102, as shown in the illustrated example. They are provided to create a purge gas circuit inside the valve assembly 100. Other configurations and arrangements are possible. The purge gas circuit can be omitted in some implementations as well.

The main valve body 102 can include another gas port 150. This port 150 can radially extend through the sidewall of the housing 110, as shown in the illustrated example. It is only partially visible in FIG. 1. This port 150 is located vertically below the side ports 140, 142 used for the purging gas circuit in the illustrated example. The port 150 is part of an actuating gas circuit 152 provided to control the actuating unit 300 inside the valve assembly 100. Further details will be given later in the description. Other configurations and arrangements are possible as well.

Figure 2:
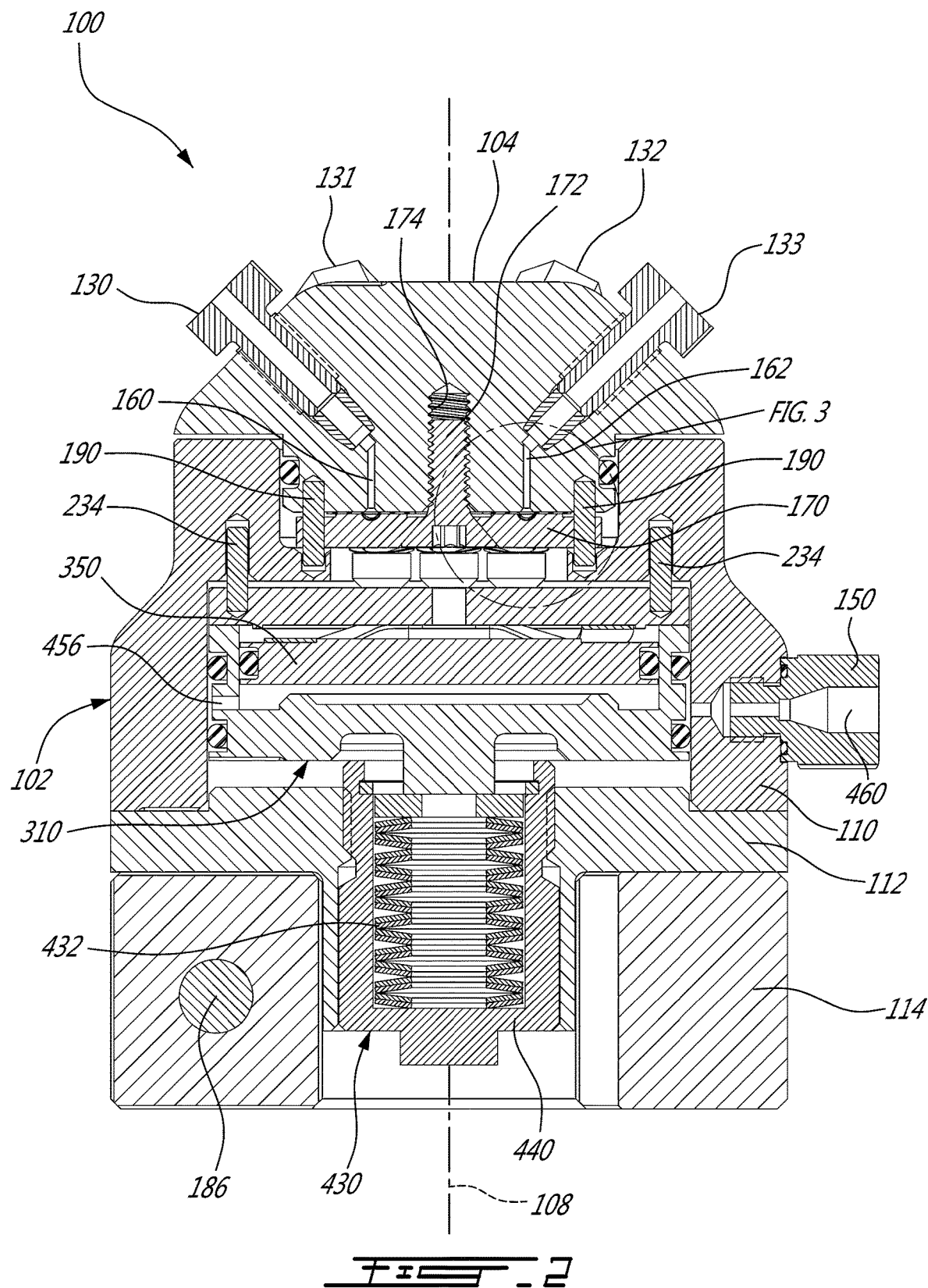
FIG. 2 is a cross section view of the valve assembly taken approximately along line 2-2 in FIG. 1.

FIG. 2 is a cross section view of the valve assembly 100 taken approximately along line 2-2 in FIG. 1.

Two of the conduits inside the upper valve head 104 can be seen in FIG. 2, namely the conduit 160 and the conduit 162. The other conduits in the upper valve head 104 that are not visible in FIG. 2 have the same configuration in the illustrated example, although other configurations and arrangements are possible. The conduit 160 corresponds to port 130 and the conduit 162 corresponds to port 133. In the illustrated example, each of these conduits 160, 162 includes two juxtaposed sections machined or otherwise created into the upper valve head 104. The first section is the obliquely-oriented threaded socket in which the threaded shank of the corresponding fitting is secured. The second section is a generally vertical narrow channel extending from the bottom of the first section to the corresponding bottom end located on a surface underneath the upper valve head 104. Other configurations and arrangements are possible.

A support plate 170 is positioned under the upper valve head 104. The support plate 170 can be made of a metallic material or of another rigid material and can be removably affixed to the upper valve head 104 using a single mechanical fastener that is coaxial with the central axis 108, as shown. This mechanical fastener is a screw 172 in the illustrated example. This screw 172 has a conical head that fits into a corresponding conical surface 176 (FIGS. 7 and 9) under the support plate 170. The shank of the screw 172 is inserted upwards into a threaded hole 174 located at the center of the upper valve head 104 in the illustrated example. Other configurations and arrangements are possible as well.

The different parts of the main valve body 102 can be seen in FIG. 2, such as the housing 110, the bottom cover 112 and the annular base 114 in the illustrated example. The bottom cover 112 can be affixed to the underside of the housing 110 using a plurality of axisymmetric bolts 182 (see for instance FIGS. 10 and 11), as shown. The bottom cover 112 can also include a downwardly-projecting cylindrical bottom section 184 that is narrower in diameter than that of the rest of the bottom cover 112. This bottom section 184 can be designed to fit into the annular base 114, which can be in the form of a C-shaped clamp, as shown in the illustrated example. The center of this annular base 114 is inserted over the bottom section 184 and a bolt 186 is secured into a corresponding threaded hole extending across the slot so as to slightly decease the interior diameter of the annular base 114, thereby creating an interfering engagement between the outer surface of the bottom section 184 and the inner surface of the annular base 114. Other configurations and arrangements are possible.

Figure 3:
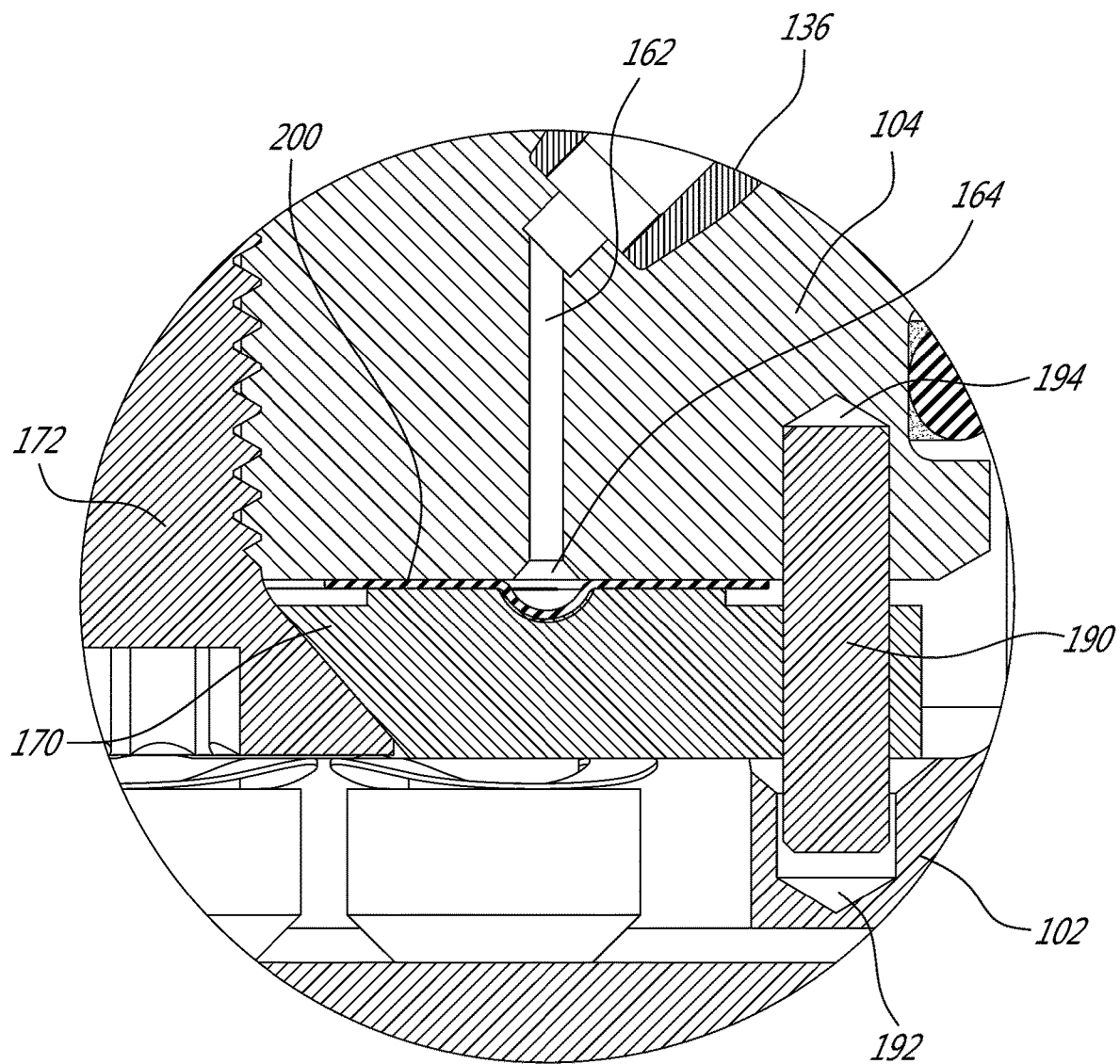
FIG. 3 is an enlarged fragmentary view of some of the parts around the bottom side of the upper valve head in FIG. 2.

FIG. 3 is an enlarged fragmentary view of some of the parts around the bottom side of the upper valve head 104 in FIG. 2. As can be seen, a sealing diaphragm 200 is interposed between the upper valve head 104 and the support plate 170. The sealing diaphragm 200 is generally a very thin membrane made of a resilient and very inert material, such as a polyamide. Other materials are possible as well. The sealing diaphragm 200 will be subjected to a constant mechanical pressure applied by the support plate 170 once mounted under the upper valve head 104, as shown in the illustrated example. Other configurations and arrangements are possible.

The inner end of the conduit 162 is visible in FIG. 3 at 164. This inner end 164 is beveled in the illustrated example. It is wider in diameter at its bottom edge than the channel forming the second section of the conduit 162. Other configurations and arrangements are possible.

The valve assembly 100 can include axisymmetric dowels 190 or the like extending vertically through corresponding alignment holes 232 (FIG. 6) made across the support plate 170, as shown in the illustrated example. FIG. 3 shows one of the dowels 190. A bottom portion of this dowel 190 projects into a corresponding bore hole 192 made into an internal flange 116 (FIG. 21) of the main valve body 102, and an upper portion of the dowel 190 projects into a corresponding bore hole 194 made in the upper valve head 104. Other configurations and arrangements are possible. Although the dowels 190 can be helpful in obtaining the proper angular alignment when the support plate 170 is affixed to the upper valve head 104, they can be omitted in some implementations.

Figure 4:
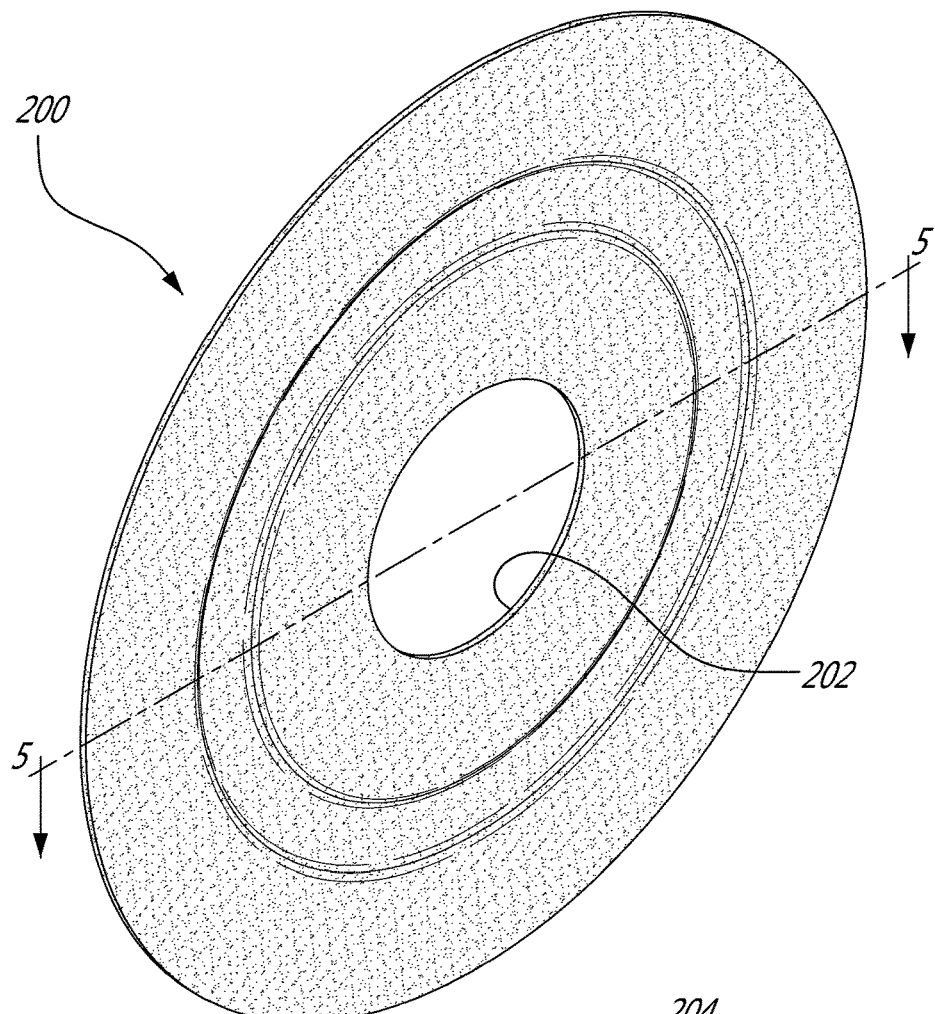
FIG. 4 is an enlarged isometric view of the sealing diaphragm in the valve assembly of FIG. 1.
Figure 5:
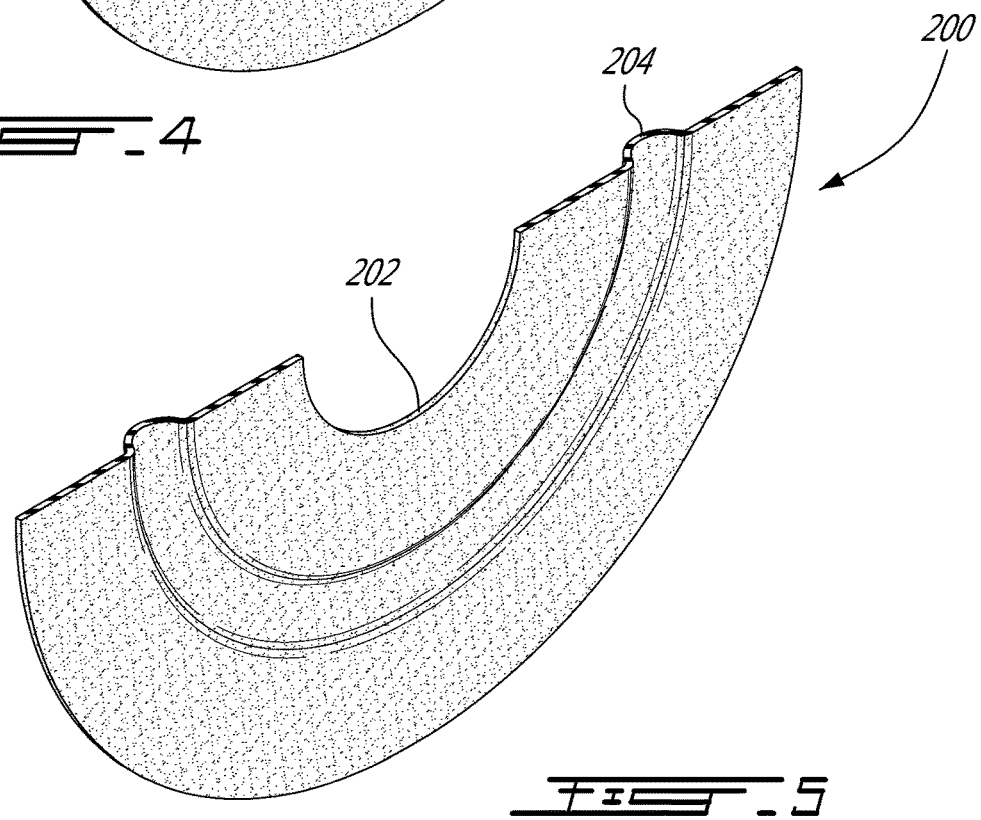
FIG. 5 is a cross section view of the sealing diaphragm taken along line 5-5 in FIG. 4.

FIG. 4 is an enlarged isometric view of the sealing diaphragm 200 in the valve assembly 100 of FIG. 1. FIG. 5 is a cross section view of the sealing diaphragm 200 taken along line 5-5 in FIG. 4. As can be seen, the sealing diaphragm 200 of the illustrated example has an annular shape. It can include a central hole 202 and can also have a preformed annular-shaped embossed section 204 that is coaxial with the central hole 202. The embossed section 204 can have a generally circular or parabolic cross-sectional shape, as shown. Other arrangements and configurations are possible as well.

Figure 6:
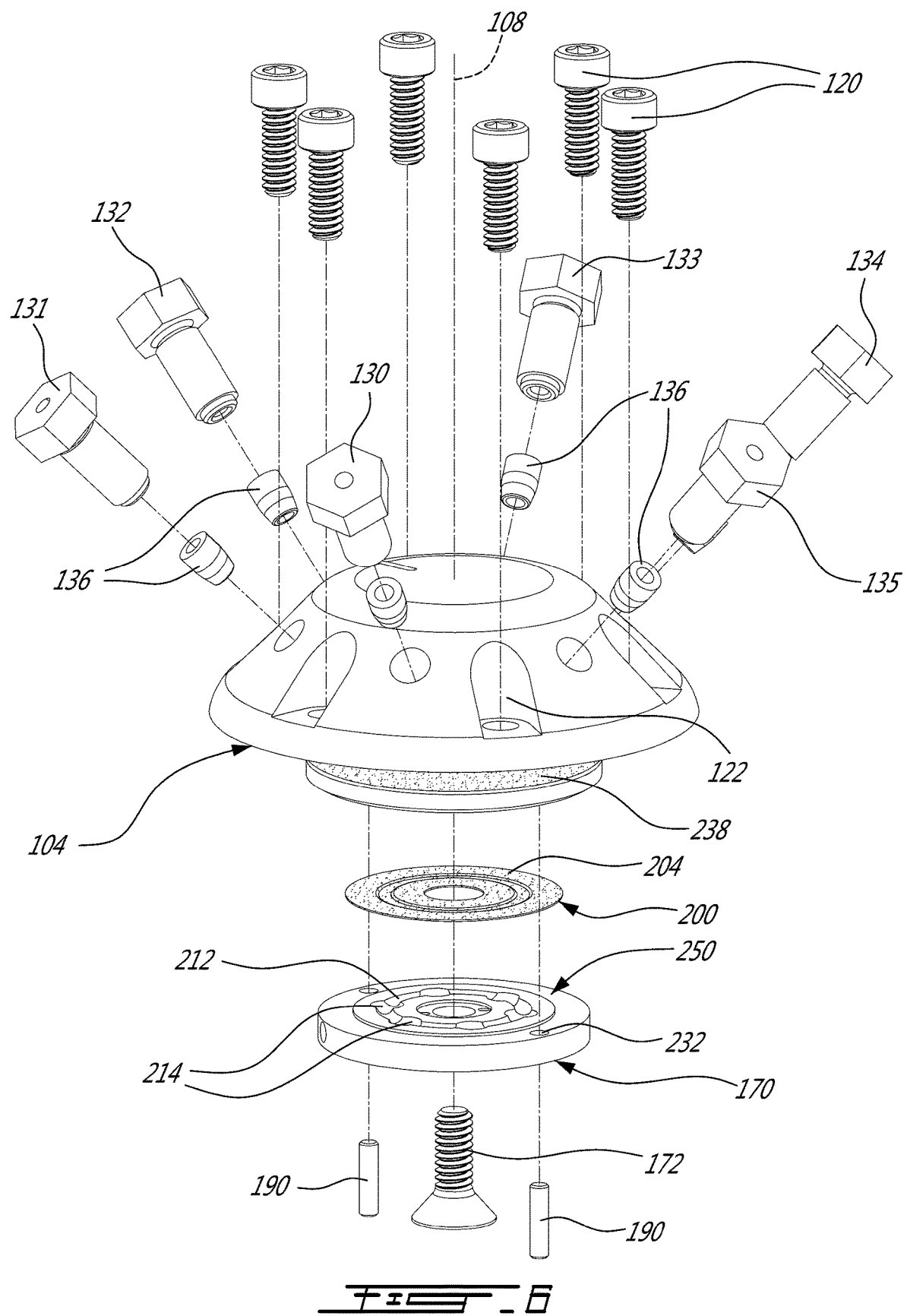
FIG. 6 is an enlarged exploded view of some of the upper parts of the valve assembly in FIG. 1.

FIG. 6 is an enlarged exploded view of some of the upper parts of the valve assembly 100 in FIG. 1, namely the upper valve head 104, the support plate 170 and the sealing diaphragm 200. FIG. 7 is a view similar to FIG. 6 but taken from another angle. As can be seen, the support plate 170 of the illustrated example is generally circular in shape. It can include a central hole 210 (see FIGS. 8 and 9) and a generally circular surface groove 212 on the upper side thereof. The central hole 210 and the surface groove 212 are coaxially disposed with reference to the central axis 108 of the valve assembly 100 in the illustrated example. This surface groove 212 is also in registry with the radial position of the embossed section 204 on the sealing diaphragm 200 and extends uninterruptedly. The illustrated support plate 170 further includes an array of axisymmetric holes 214 extending generally parallel to the central axis 108 across the support plate 170 and that are substantially in registry with the surface groove 212. Other arrangements and configurations are possible.

FIG. 6 further shows that the upper valve head 104 can include a gasket 238, for instance an O-ring or the like, having an inner part located into a groove provided on the substantially cylindrical bottom portion of the upper valve head 104. The gasket 238 will seal the junction between the bottom portion and the interior or the housing 110. Other configurations and arrangements are possible as well. The gasket 238 can be omitted in some implementations.

The embossed section 204 on the sealing diaphragm 200 and the surface groove 212 on the support plate 170 can be provided at approximately the same radial distance from the central axis 108 when the valve assembly 100 is completed. The embossed section 204 can be oriented towards the surface groove 212 and will then project inside the surface groove 212, as shown for instance in FIG. 3. The radius of curvature of the surface groove 212 can be made larger than that of the underside of the embossed section 204 on the sealing diaphragm 200. This can provide enough room for the embossed section 204 to expand. Other configurations and arrangements are possible.

The various inner ends of the conduits inside the upper valve head 104 are visible in FIG. 7. One of them is the inner end 164 of the conduit 162. The various inner ends are positioned on a planar bottom surface 240 underneath the upper valve head 104 and they can be disposed in an axisymmetric pattern with reference to the central axis 108, as shown in the illustrated example. Other configurations and arrangements are possible.

The inlet of the threaded hole 174 (FIG. 2) at the center of the upper valve head 104 can be surrounded by a conical surface 242, as shown in the illustrated example. Other arrangements and configurations are possible.

The planar bottom surface 240 can be machined to be as smooth and flawless as possible to increase the sealing bond between the sealing diaphragm 200 and the planar bottom surface 240.

FIG. 8 is an enlarged isometric view of the support plate 170 in FIGS. 6 and 7. FIG. 9 is a cross section view of the support plate 170 taken along line 9-9 in FIG. 8. As can be seen, the support plate 170 can include a planar upper surface 250 that is generally normal to the central axis 108. The planar upper surface 250 can be divided in two annular sections 250A, 250B by the surface groove 212. The planar upper surface 250 can also be machined to be as smooth and flawless as possible to increase the sealing bond with the sealing diaphragm 200. Other arrangements and configurations are possible.

The support plate 170 can include an outer peripheral surface 252 that is slightly below the planar upper surface 250, as best seen in FIGS. 8 and 9 of the illustrated example. There can also be an inner annular surface 254 around the central hole 210 having a reduced height, as shown. These recessed surfaces 252, 254 can enhance the sealing with the sealing diaphragm 200 by concentrating the mechanical pressure applied by the support plate 170 on each side of the surface groove 212. Other configurations and arrangements are possible. Some of the features can also be omitted entirely in some implementations.

It should be noted that the height differences in FIGS. 8 and 9 were exaggerated for the sake of illustration.

The upper valve head 104 and the support plate 170 can be designed to control the creep deformation on the sealing diaphragm 200. In the illustrated example, the intense force applied by the support plate 170, through the fastener 172 but also at the outer periphery through the bolts 120, can cause the sealing diaphragm 200 to creep. This can form a bulge at the junction and the material will be forced back into the sealing area to create a double creep seal. The creep can fill any asperity on the sealing diaphragm 200, generally up to about 25 microns (about 0.001 inch). The recessed surfaces 252, 254 of the support plate 170 can also mitigate the risks of damaging the sealing diaphragm 200 due to an excessive force. Other configurations and arrangements are possible.

The support plate 170 can include a pair of radially-extending channels 220 passing under the planar upper surface 250 and between the axisymmetric holes 214, as shown in the illustrated example. Each channel 220 extends from the radially outer surface of the support plate 170 to a corresponding top opening 222 provided on the recess surface 254, each opening 222 being the inner end of an obliquely-disposed inner portion of a corresponding channel 220. The channels 220 can be part of a local gas circuit for circulating a purge gas around the center of the sealing diaphragm 200. Other configurations and arrangements are possible. These features can also be omitted in some implementations.

Figure 10:
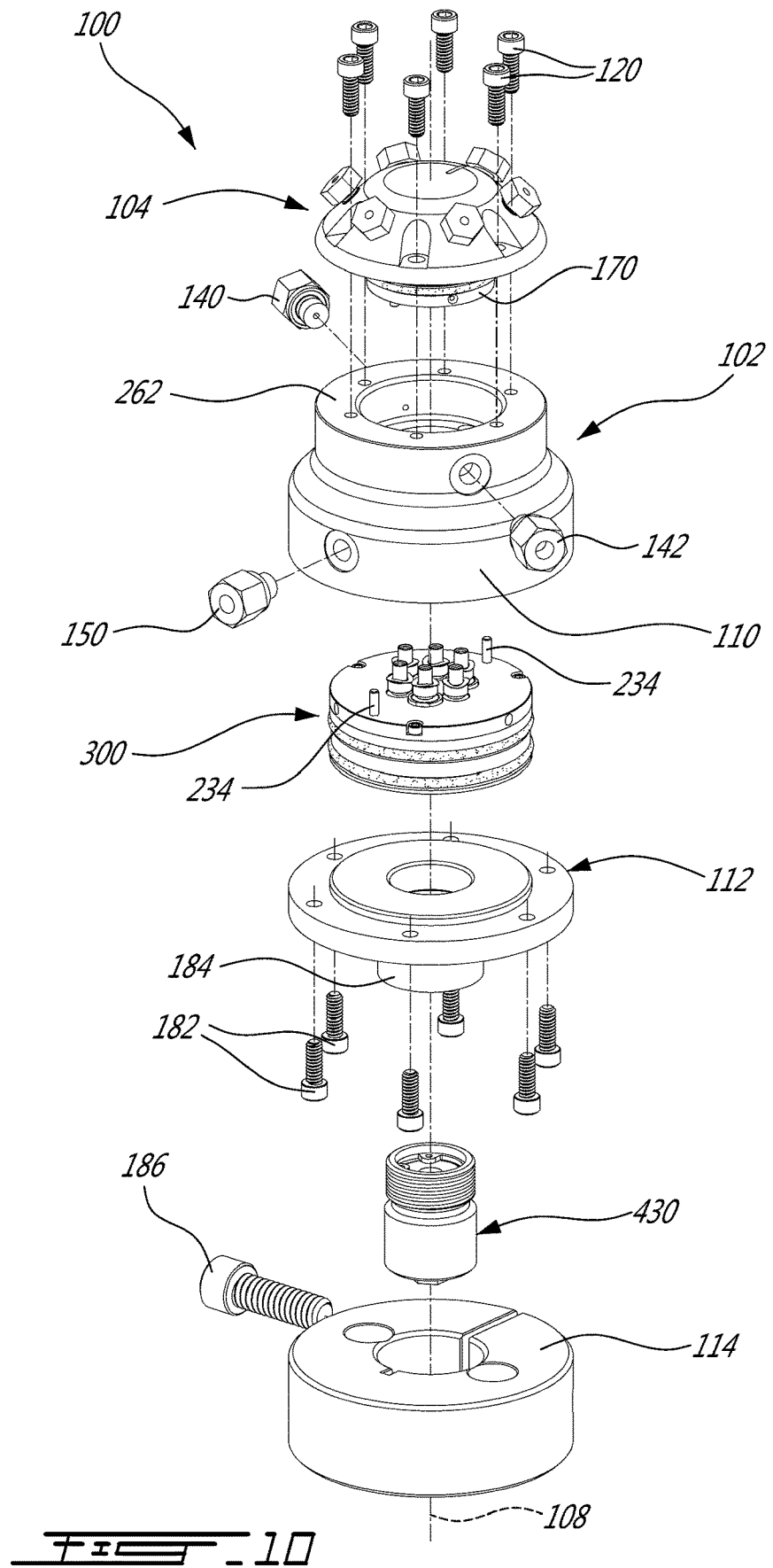
FIG. 10 is an isometric and partially exploded view of the valve assembly in FIG. 1.
Figure 11:
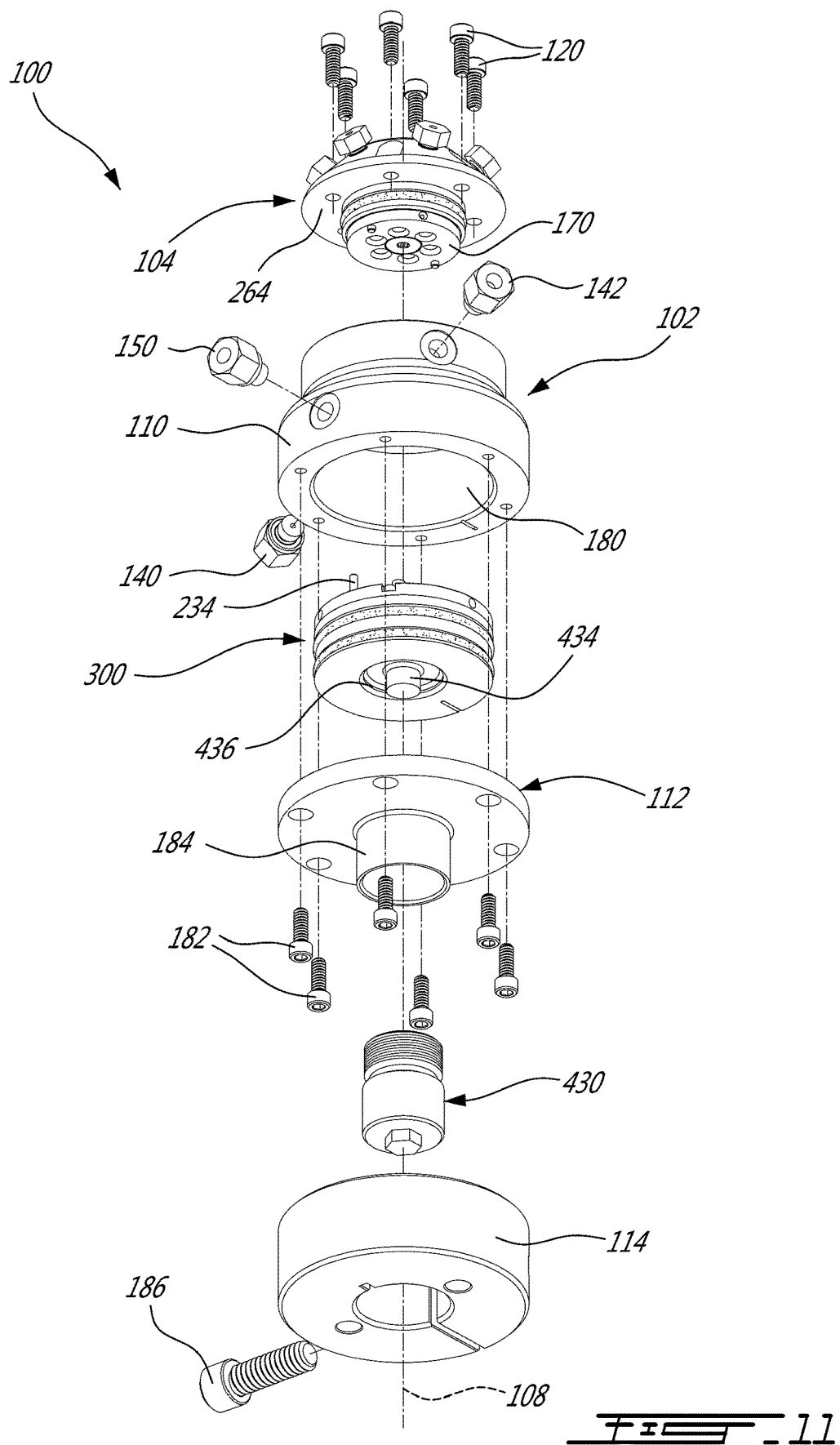
FIG. 11 is a view similar to FIG. 10 but taken from another angle.

FIG. 10 is an isometric and partially exploded view of the valve assembly 100 in FIG. 1. FIG. 11 is a view similar to FIG. 10 but taken from another angle. Among other things, these figures illustrate the parts of the main valve body 102 detached from one another. The support plate 170 is shown being affixed to the upper valve head 104 in FIGS. 10 and 11 for the sake of simplicity. The sealing diaphragm 200 (visible in other figures) is thus located between them.

FIGS. 10 and 11 further show that the housing 110 and the upper valve head 104 can include corresponding planar annular surfaces 262, 264. These surfaces 262, 264 can be parallel to one another, as shown in the illustrated example. They can be kept slightly away from one another once the valve assembly 100 is completed. This spacing can facilitate the adjustment of the force exerted by the bolts 120. Other configurations and arrangements are possible as well.

The actuating unit 300 of the valve assembly 100 can also be seen in FIGS. 10 and 11. This actuating unit 300 is responsive to an external actuation pressure coming from the actuating gas circuit 152 (FIG. 1). Most of the parts of the actuating unit 300 are shown as assembled in FIGS. 10 and 11.

Figure 12:
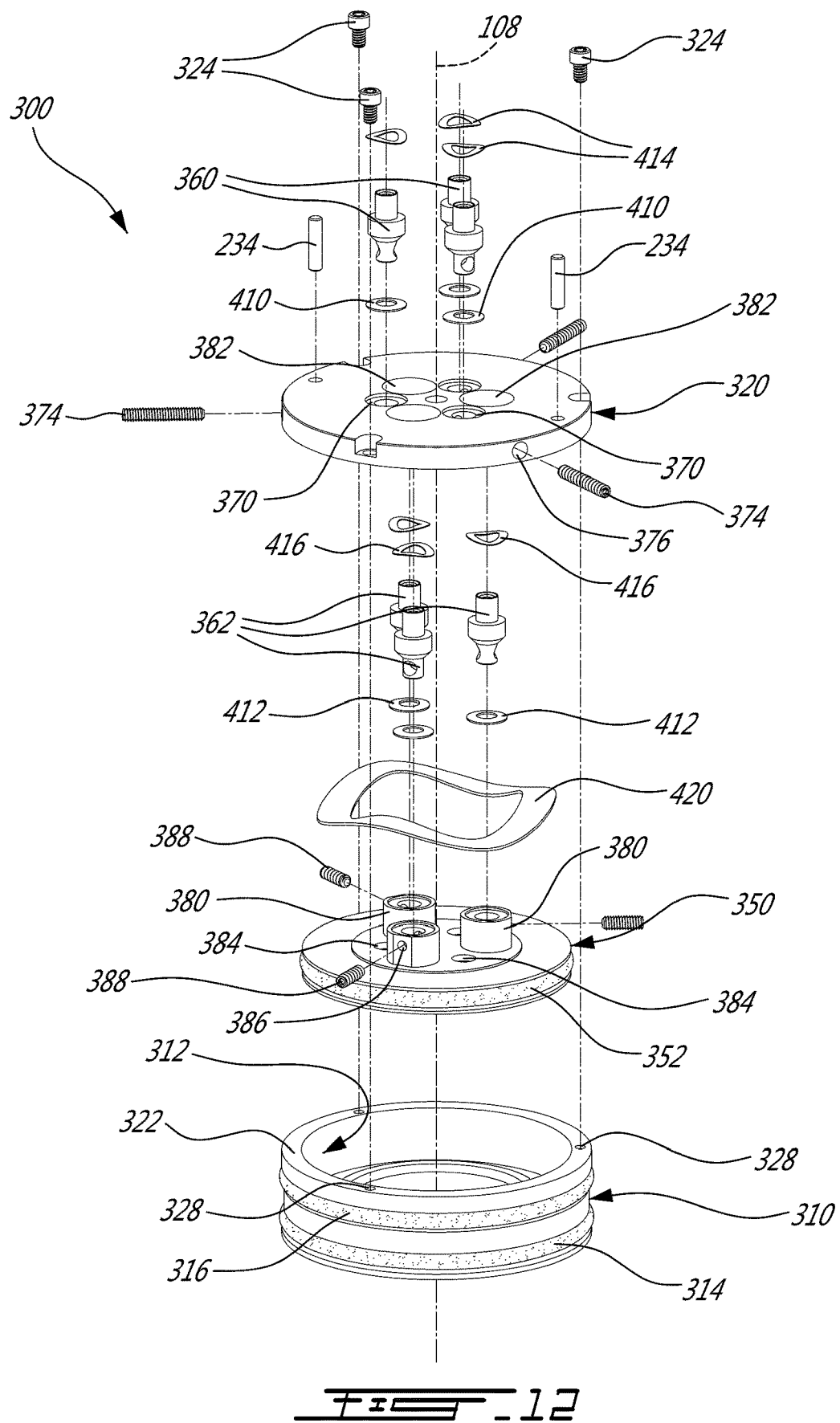
FIG. 12 is an enlarged exploded view of some of the parts of the actuating unit in FIGS. 10 and 11.
Figure 13:
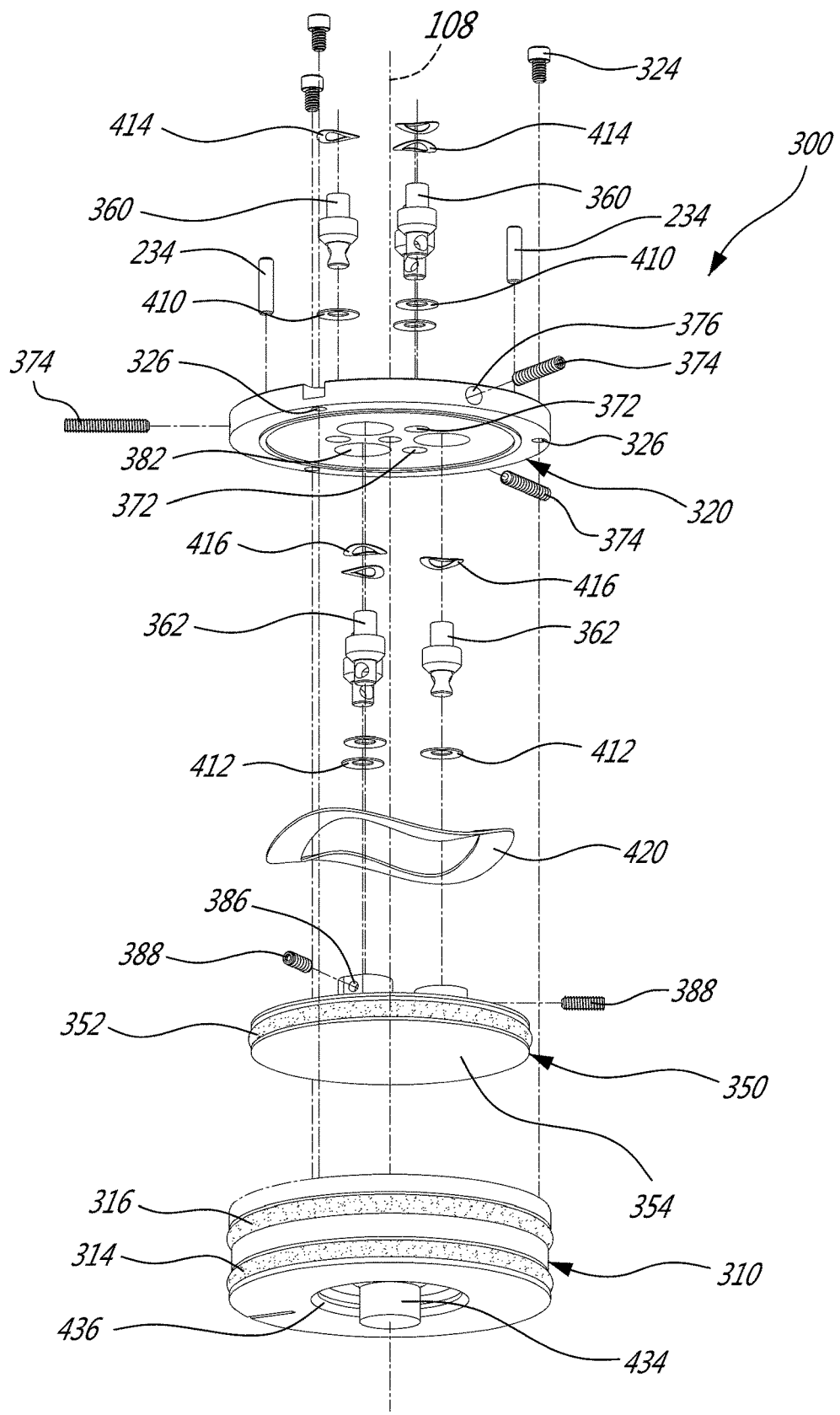
FIG. 13 is a view similar to FIG. 12 but taken from another angle.

FIG. 12 is an enlarged exploded view of some of the parts of the internal actuating unit 300 in FIGS. 10 and 11. FIG. 13 is a view similar to FIG. 12 but taken from another angle. Many of the parts of the actuating unit 300 can also be seen in FIG. 2.

The actuating unit 300 includes a first piston 310. The first piston 310 has a body defining an inner cylindrical cavity 312 coaxially disposed with reference to the central axis 108 in the illustrated example. The first piston 310 is designed to be positioned inside the inner cavity 180 of the main valve body 102. It can reciprocate, along the central axis 108, between at least a bottom position and an upper position. The first piston 310 can engage the smooth inner sidewall surface of the inner cavity 180 through a pair of vertically spaced-apart gaskets 314, 316 mounted in corresponding outer grooves provided around the first piston 310, as shown in the illustrated example. These gaskets 314, 316 can be for instance O-rings or the like. Other configurations and arrangements are possible as well.

The inner cavity 312 of the first piston 310 can be open at the top but this top end is then closed by a disc-shaped perforated plate 320, as shown in the illustrated example. The perforated plate 320 can be affixed to the upper rim surface 322 of the first piston 310 using a set of axisymmetric screws 324 passing through corresponding holes 326 provided at the periphery of the perforated plate 320. These screws 324 can be inserted in corresponding threaded holes 328 on the upper rim surface 322. Other configurations and arrangements are possible as well.

A second piston 350 is positioned inside the inner cavity 312 of the first piston 310. The second piston 350 can reciprocate, along the central axis 108, between at least a bottom position and an upper position. The second piston 350 is thus embedded within the first piston 310. The second piston 350 can engage the smooth inner sidewall surface of the inner cavity 312 of the first piston 310 using a gasket 352, for instance an O-ring or the like, as shown in the illustrated example. Other configurations and arrangements are possible.

The main function of the first and second pistons 310, 350 is to actuate the vertical position of corresponding sets of plungers 360, 362. More particularly, in the illustrated example, the first piston 310 actuates the plunger 360 and the second piston 350 actuates the plungers 362. Each plunger 360, 362 generally extends parallel to the central axis 108 and is movable at least between a bottom position and an upper position. Each plunger 360, 362 includes an upper end engaging the underside of the sealing diaphragm 200 in the upper position. This engagement pushes the corresponding contact area upwards to close one of the passages between two adjacent inner ends of the conduits. The passages are created inside the surface groove 212 on the support plate 170. Other configurations and arrangements are possible.

The plungers 360 of the first set can be referred to as the normally-closed plungers 360 while the plungers 362 of the second set can be referred to as the normally-opened plungers 362. They can be made of stainless steel. Other materials are possible as well.

The plungers 360, 362 of the two sets can be disposed in a staggered arrangement about the central axis 108, as shown in the illustrated example. Each normally-closed plunger 360 is then located between two normally-opened plungers 362, and vice versa. Other configurations and arrangements are possible.

The normally-closed plungers 360 can be mounted in corresponding seats 370 provided over the perforated plate 320. The plungers 360 are thus made integral with the first piston 310 through the perforated plate 320 in the illustrated example. The seats 370 can be in the form of circular recesses with through-holes 372 (FIG. 13) at their center to receive a bottom end of the plungers 360. A corresponding rectilinear side channel ends inside each of the through-holes 372 in the illustrated example. These side channels can be provided to affix the plungers 360 using elongated threaded fasteners 374, as shown in the illustrated example, these side channels radially extending within the perforated plate 320. The outer opening 376 of one of the channels is visible in FIGS. 12 and 13. Other configurations and arrangements are possible.

The normally-opened plungers 362 can be mounted in corresponding seats 380 provided over the second piston 350, as shown in the illustrated example. These seats 380 project above the upper surface of the second piston 350 and can extend through a corresponding opening 382 made through the perforated plate 320. The second piston 350 can also include a set of holes 384 on its upper surface to provide clearance for the bottom ends of the plungers 360 that extend below the underside of the perforated plate 320, as shown in the illustrated example. Other configurations and arrangements are possible.

Still, the seats 380 for the normally-opened plungers 362 can include an upper circular recess with a hole at their center, as shown in the illustrated example. They can also include a planar side wall on which is provided a threaded transversal hole 386 in which a threaded fastener 388 can be secured to affix the corresponding plunger 362. Other configurations and arrangements are possible.

The valve assembly 100 can include another set of axisymmetric dowels 234 or the like extending vertically through corresponding alignment holes made across the perforated plate 320, as shown for instance in FIGS. 12 and 13 of the illustrated example. The dowels 234 can also be seen in FIGS. 2, 10 and 11. The upper portion of these dowels 234 can slidably engage corresponding alignment holes made in the upper section of the housing 110. Other configurations and arrangements are possible. Although the dowels 234 can be helpful in obtaining the proper angular alignment when the perforated plate 320 reciprocates, they can be omitted in some implementations.

FIG. 14 is an enlarged side view of one of the plungers 360 in FIGS. 12 and 13. FIG. 15 is an enlarged side view of another one of the plungers, namely the plungers 362, in FIGS. 12 and 13. As can be seen, the two plungers 360, 362 can have a very similar design, as shown in the illustrated example. They could also be different in other implementations. In the illustrated example, the plungers 360 include an enlarged base portion 390, a generally cylindrical upper portion 392 projecting above the base portion 390, and a generally cylindrical bottom portion 394 projecting under the base portion 390. The bottom portion 394 can include a transversal through-hole 396 for receiving the corresponding fastener 374. As can also be seen, the tip of the upper portion 392 can include a generally circular central cavity 398 devoid of sharp edges. This central cavity 398 can mitigate the stresses on the surface of the sealing diaphragm 200 when engaged by the plunger 360. Other configurations and arrangements are possible. At least some of these features can be omitted in other implementations.

Likewise, in the illustrated example, the plungers 362 include an enlarged base portion 400, a generally cylindrical upper portion 402 projecting above the base portion 400, and a generally cylindrical bottom portion 404 projecting under the base portion 400. The bottom portion 404 includes a transversal through-hole 406 for receiving the corresponding fastener 388. The tip of the upper portion 402 can include a generally circular central cavity 408 devoid of sharp edges, as shown in the illustrated example. This central cavity 408 can mitigate the stresses on the surface of the sealing diaphragm 200 when engaged by the plunger 362. Other configurations and arrangements are possible. At least some of the features can be omitted in other implementations.

The actuating unit 300 can include washers 410 provided between the normally-closed plungers 360 and their corresponding seats 370, as shown in the illustrated example. These washers 410 can be annular in shape and can fit inside the recess on the upper side of the corresponding seats 370. The enlarged base portion 390 (FIG. 14) of each plunger 360 can include a bottom conical surface that will engage the inner rim edge of the corresponding washer 410. Still, the washers 410 can have a slightly nonplanar shape creating a mild resilient effect along the vertical axis. This could be useful to cushion the impact force when the tip of the normally-opened plungers 360 engage the sealing diaphragm 200. Similar washers 412 can also be provided under the normally-opened plungers 362, as shown in the illustrated example. Other configurations and arrangements are possible. They can be omitted in some implementations.

Sets of annular spring members 414 can be inserted onto the upper portion 392 of each plunger 360 up to the upper surface of the base portion 390, as shown in the illustrated example. Similar annular spring members 416 can be provided around the upper portion 402 of each plunger 362. These spring members 414, 416 can be made of a relatively thin resilient material having a somewhat zig-zag shape to provide a mild spring force so as to attenuate the impact of the plungers 360, 362 with the sealing diaphragm 200. The upper side of the spring members 414, 416 rests against the bottom side of the support plate 170 in the illustrated example. Other configurations and arrangements are possible. They can be omitted in some implementations.

The bottom portion 404 (FIG. 15) of each plunger 362 can also be made slightly smaller in diameter than that of the hole at the center of the seats 380. This, in addition to the bottom conical surface of the base portion 400, can provide some freedom to the plungers 362 to compensate for any slight misalignment. The same feature can be provided on the normally-closed plungers 360, as shown in the illustrated example. Other configurations and arrangements are possible. The feature can also be omitted in some implementations.

A force-generating mechanism is provided to urge the second piston 350 towards its bottom position. This force-generating mechanism can include a return spring 420 that is in the form of a wave disc in the illustrated example. It is coaxially disposed with reference to the central axis 108 and it is located between the perforated plate 320 and the second piston 350. The upper side of the spring 420 engages the bottom surface of the perforated plate 320 while its bottom side engages the upper surface of the second piston 350. The surfaces can be machined to keep the spring 420 centered. Other configurations and arrangements are possible. For instance, one could use one or more helical springs, or even another kind of force-generating mechanism. Other variants are possible as well.

Another force-generating mechanism is provided to urge the first piston 310 towards its upper position. This other force-generating mechanism can be in the form of a spring pack unit 430 having one or more Belleville springs 432 therein, as shown in the illustrated example. This spring pack unit 430 is a self-contained package or cartridge that can be easily removed from the valve assembly 100 as a whole. Other configurations and arrangements are possible. For instance, one could use one or more helical springs, or even another kind of force-generating mechanism, including one that is not a self-contained unit. Other variants are possible as well.

It should be noted that since there is a plurality of juxtaposed Belleville springs in the spring pack unit 430 of the illustrated example, the biasing element therein will now be referred to as the Belleville spring stack 432.

Figure 22:
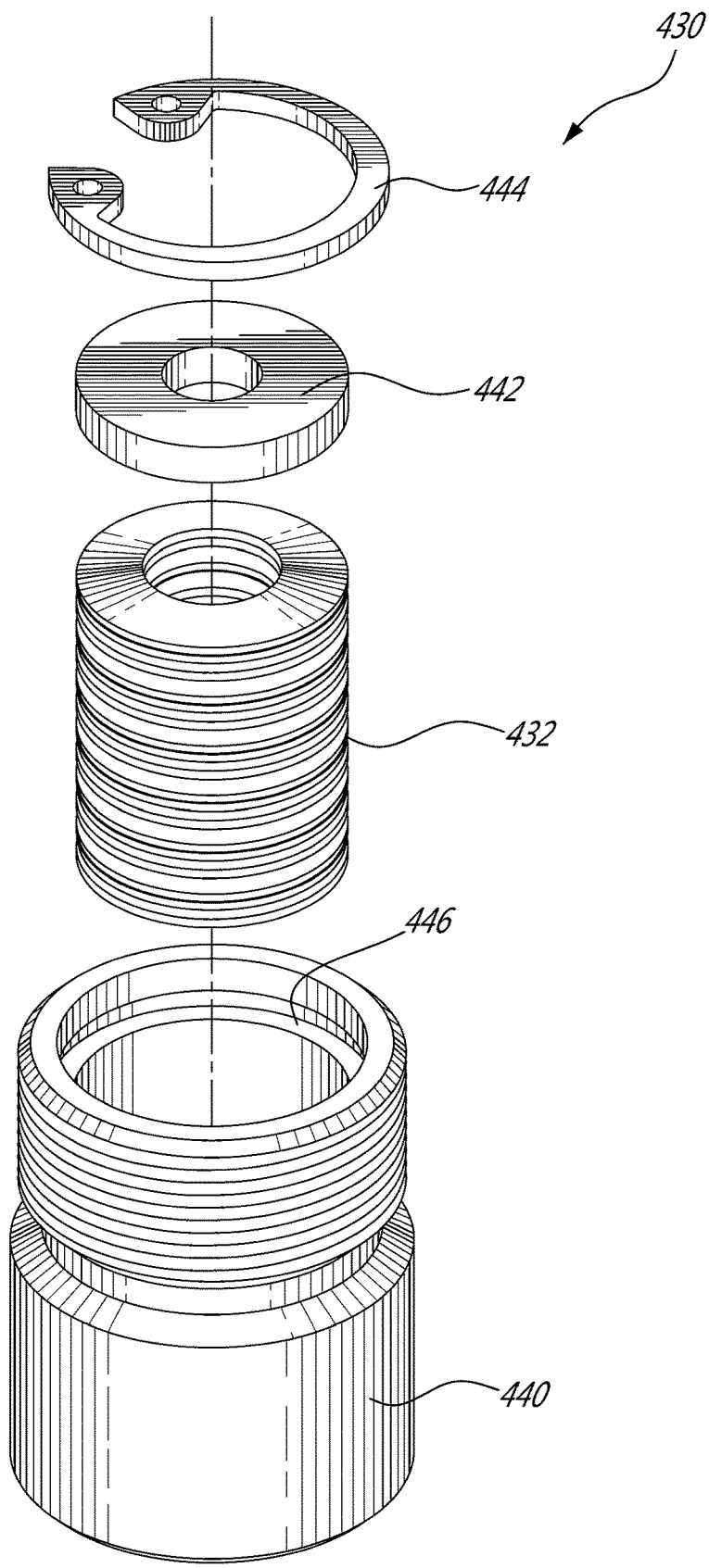
FIG. 22 is an exploded view of the spring pack unit provided in FIG. 2.
Figure 23:
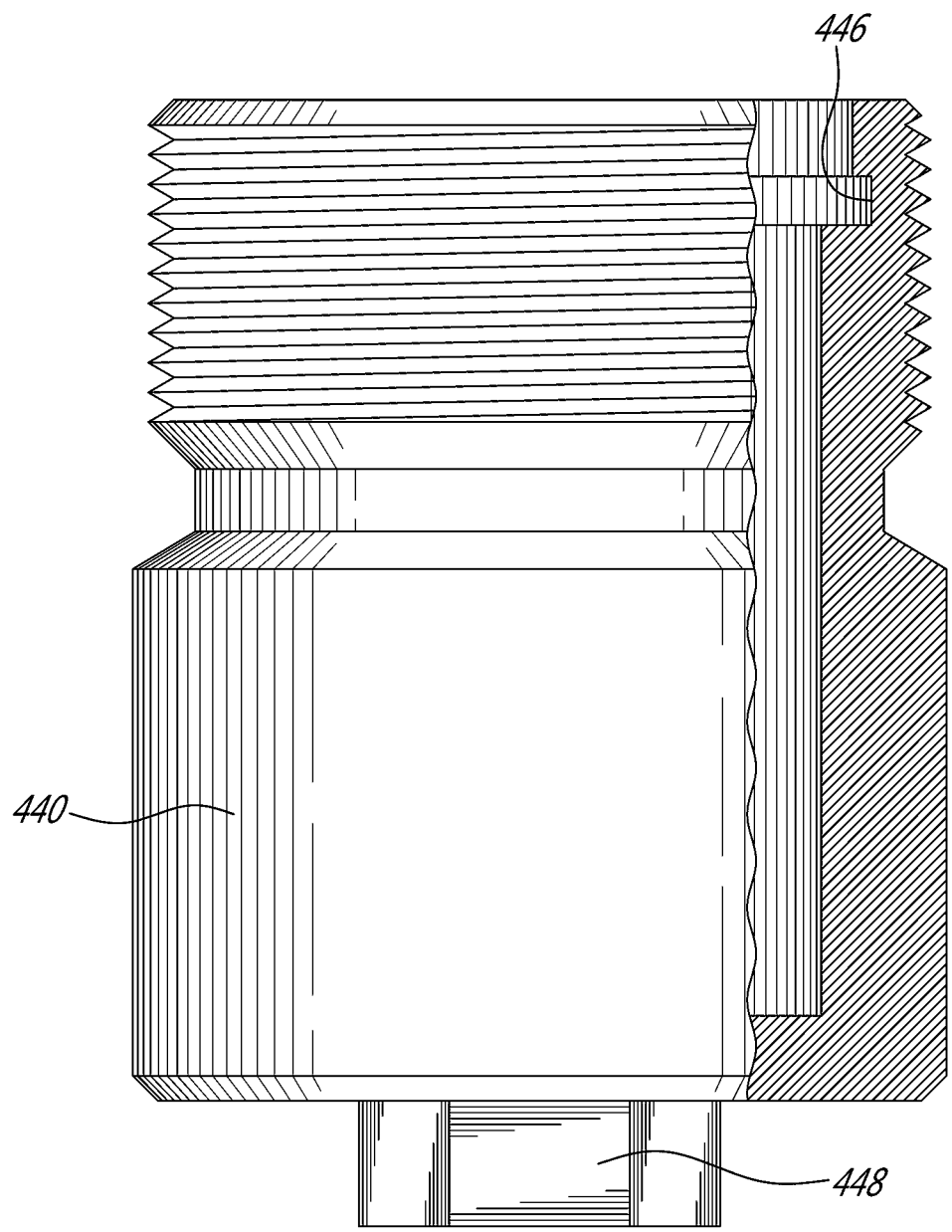
FIG. 23 is a side view of the casing of the spring pack unit in FIG. 22.

The spring pack unit 430 is illustrated in greater details in FIGS. 22 and 23. FIG. 22 is an exploded view thereof. As can be seen, the spring pack unit 430 includes a generally cylindrical rigid casing 440. This casing 440 has a closed bottom and is opened at the top. It includes an internal cavity configured to receive the Belleville spring stack 432 therein, the bottom side of the Belleville spring stack 432 abutting against the bottom. A flat washer 442 engages the top of the Belleville spring stack 432. This washer 442 and the Belleville spring stack 432 can be kept inside the casing 440 using an internal circlip 444 provided between the open top end of the casing 440 and the washer 442. The circlip 444 sits in an internal retaining groove 446. It prevents the washer 442 and the whole Belleville spring stack 432 from getting out the casing 440. The washer 442 can still be moved further inside the cavity to compress the Belleville spring stack 432. Other configurations and arrangements are possible.

FIG. 23 is a side view of the casing 440 of the spring pack unit 430 in FIG. 22. FIG. 23 includes a partial cutaway portion to better show the internal shape thereof, more particularly the retraining groove 446. It also shows that the spring pack unit 430 can include a hexagonal bottom member 448 underneath the casing 440. This bottom member 448 can be engaged by a tool to rotate the whole spring pack unit 430, as shown in the illustrated example. The outer surface of the upper section of the casing 440 can include external threads engaging corresponding internal threads inside the bottom section 184 of the bottom cover 112, as also shown of the illustrated example. With such arrangement, one can easily remove and reinstall a different spring pack unit 430, for instance having a different setting. The bottom member 448 can also be useful to adjust the preloading, for instance using a torque wrench or the like. Furthermore, the various parts can be designed to prevent the spring pack unit 430 from being inserted too far. In the illustrated example, the bottom section of the spring pack unit 430 is made slightly larger than the upper section where the external threads are present. The top shoulder of the bottom section will the abut against the corresponding section inside the bottom cover 112 where the internal threads are present. Other configurations and arrangements are possible as well.

When the illustrated spring pack unit 430 is mounted inside the valve assembly 100, it is coaxially disposed with reference to the central axis 108 and cooperates with the first piston 310, the Belleville spring stack 432 urging the first piston 310 upwards. Various configurations and arrangements can be used.

In the illustrated example, the upper side of the washer 442 is engaged by the first piston 310, more particularly by a downwardly-projecting cylindrical member 434 that is coaxially disposed with reference to the central axis 108. The outer diameter of the cylindrical member 434 can be smaller than that of the inner diameter of the circlip 444 inside the casing 440 but be larger than that of the inner diameter of the washer 442. The cylindrical member 434 and the washer 442 can always be in engagement with one another to keep a minimum biasing force urging the first piston 310 upwards. This force can be adjusted by rotating the spring pack unit 430 in one direction or another, using for instance a tool engaging the bottom member 448, to change the position of the spring pack unit 430 along the central axis 180. This way, one can adjust the force generated by the Belleville spring stack 432 from the outside using a very simple procedure. The underside of the first piston 310 can include a bottom cavity 436 (FIG. 11) surrounding the cylindrical member 434 to improve the compactness of the assembly. Other configurations and arrangements are possible as well, for instance other mechanisms to change the position of the spring pack unit 430.

Figure 16:
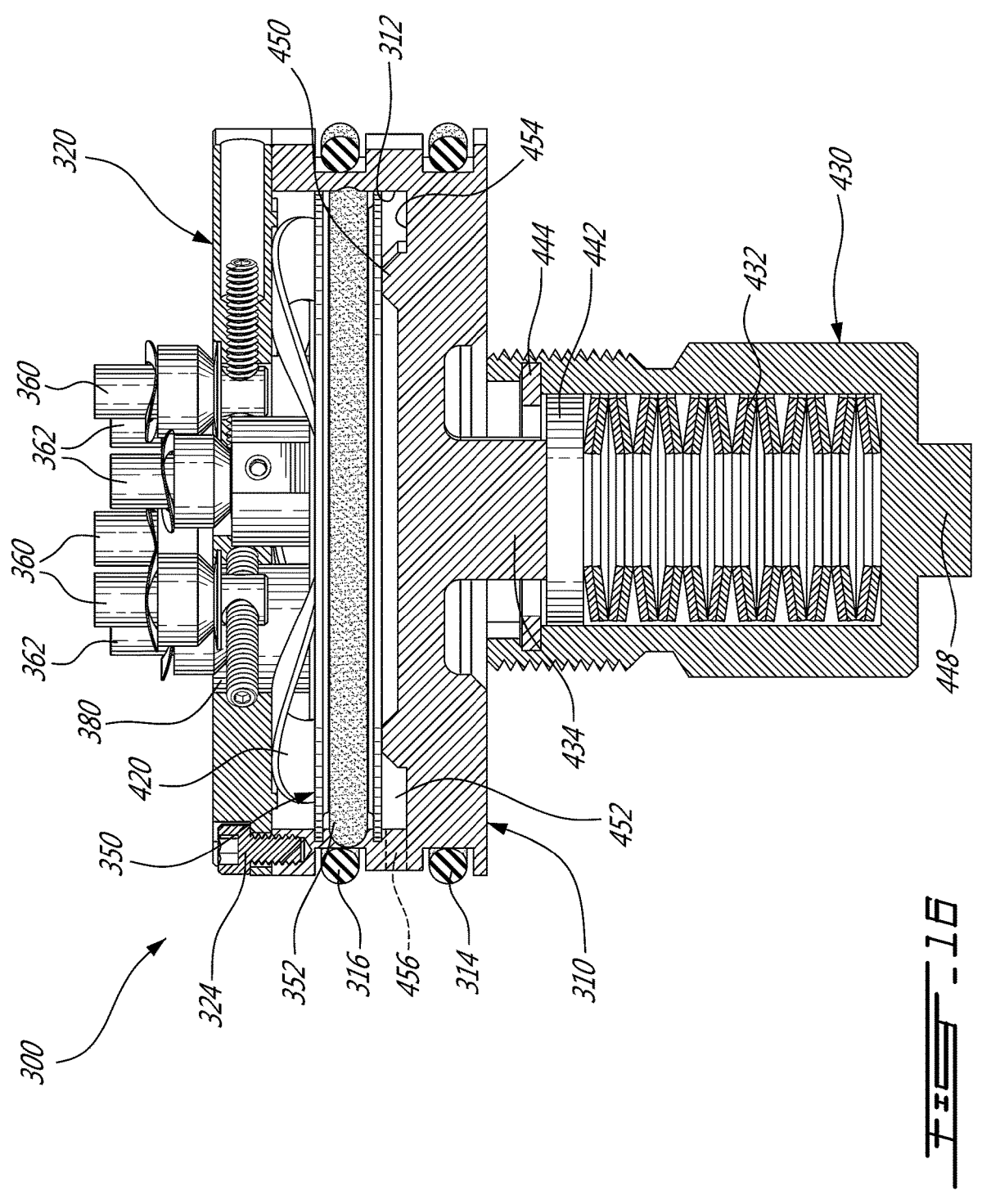

FIG. 16 is an enlarged cutaway view of the actuating unit 300 in FIGS. 10 and 11. The viewpoint in FIG. 16 was slightly offset in order to show all six plungers 360, 362 in the illustrated example. The return spring 420 above the second piston 350 is visible. As can be seen, the bottom of the inner cavity 312 can include a generally annular raised section 450 projecting upwardly therein. This annular section 450 can have a substantially planar upper surface, as shown in the illustrated example. This annular section 450 is surrounded by a generally annular space 452 having a bottom surface 454. The bottom surface 454 is the deepest portion of the inner cavity 312 in the illustrated example. It can extend around the entire periphery of the inner cavity 312. The space 452 is in fluid communication with another annular space located just outside the main body of the first piston 310 through a lateral channel 456 provided across the sidewall. This outer annular space extends between the two spaced-apart gaskets 314, 316 around the first piston 310. The gaskets 314, 316 engage the surface inside the inner cavity 180 (FIG. 11) within the main valve body 102. However, in the illustrated example, there is also a conduit 460 (FIG. 2) through the sidewall of the housing 110 and it is in fluid communication with the port 150. The channel 456 thus allows establishing a fluid communication with the space inside the inner cavity 312. Other configurations and arrangements are possible.

If desired, the parts can be designed so that the bottom surface 354 of the second piston 350 does not engage the upper surface of the annular section 450 at its bottom position, as shown in FIG. 16 of the illustrated example. This maximizes the surface exposed to the pressure. Other configurations and arrangements are possible.

The terms "normally-closed" and "normally-opened" refer to the basic state of the internal actuating unit 300, namely when no external actuation is provided. This corresponds to what is shown in FIG. 16 since in FIG. 16, the gas pressure inside the inner cavity 312 is not enough to move the second piston 350 out of its bottom position. The second piston 350 is kept in this position under the biasing force generated by the return spring 420. Meanwhile, the first piston 310 is kept in its upper position by the biasing force generated by the other return spring, namely the one coming from the Belleville spring stack 432 in the illustrated example. The tips of the plungers 360 of the first set are located at their upper position. The force applied on the sealing diaphragm 200 corresponds to the biasing force generated by the Belleville spring stack 432. The plungers 362 of the second set, namely the normally-opened plungers 362, are at their bottom position. They are thus out of engagement with the sealing diaphragm 200.

Figure 17:
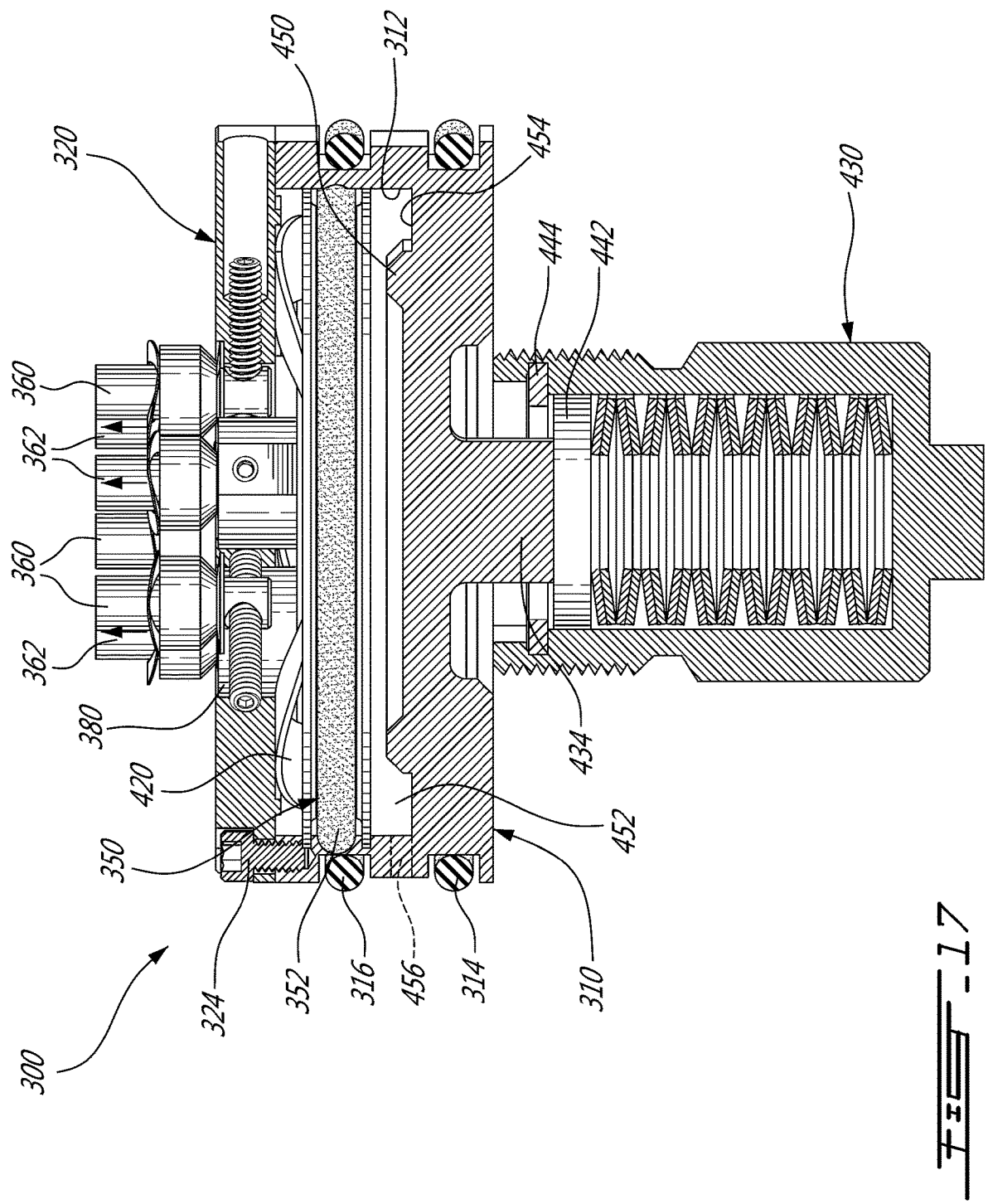
FIG. 17 corresponds to what is shown in FIG. 16 after a pressurized actuating gas entered the space located under the second piston inside the inner cavity of the first piston so as to move the second piston to its upper position.

FIG. 17 corresponds to what is shown in FIG. 16 after a pressurized gas entered the space located under the second piston 350 inside the inner cavity 312 of the first piston 310 so as to move the second piston 350 to its upper position. The second piston 350 moves upwards as soon as the force generated by the pressure overcomes the biasing force from the return spring 420. The second piston 350 will continue moving up until the corresponding set of plungers 362 engages the sealing diaphragm 200. The first piston 310, however, will not move as long as the second piston 350 does not reach its upper position if the biasing force generated by the Belleville spring stack 432 is higher than the biasing force generated by the return spring 420 within the range of positions of the second piston 350. All plungers 360, 362 engage the sealing diaphragm 200 when the internal actuating unit 300 is set at the position shown in FIG. 17. Hence, all gas circuits are closed.

Figure 18:
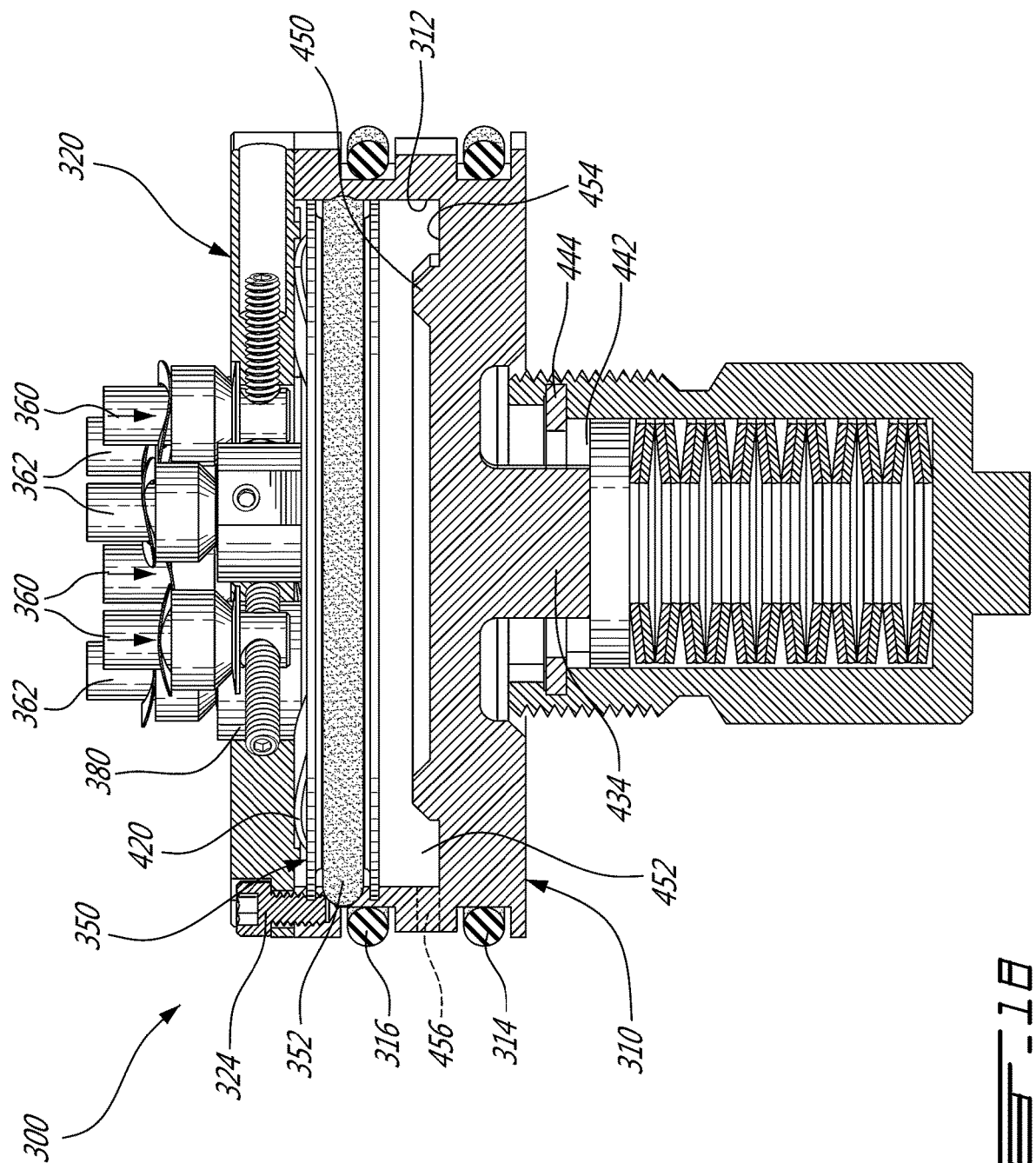
FIG. 18 corresponds to what is shown in FIG. 17 after the pressure further increased so as to move the first piston to its bottom position.

FIG. 18 corresponds to what is shown in FIG. 17 after the pressure was further increased enough to move the first piston 310 to its bottom position. The downward movement of the first piston 310 occurs when the force generated by the pressure inside its inner cavity 312 overcomes the biasing force generated by the Belleville spring stack 432. The second piston 350 will remain in place since it is pushed upwards due to the pressure inside the inner cavity 312. The plungers 360 move out of engagement with the sealing diaphragm 200 but the plungers 362 remain against it. The second set of gas circuits is now open.

FIG. 18 further illustrates one of the benefits of the proposed concept. With this design, further increasing the pressure inside the inner cavity 312 will push the first piston 310 further down but this will not increase the force applied on the sealing diaphragm 200 by the plungers 362 of the second set above the biasing force generated by the Belleville spring stack 432. At one point, if the pressure increases furthermore, the perforated plate 320 will engage the upper side of the second piston 350 but the force applied on the sealing diaphragm 200 by the plungers 362 will be unchanged. Thus, no excessive force will be applied and the plungers 362 will remain in the same position even during the overpressure event.

Figure 19:
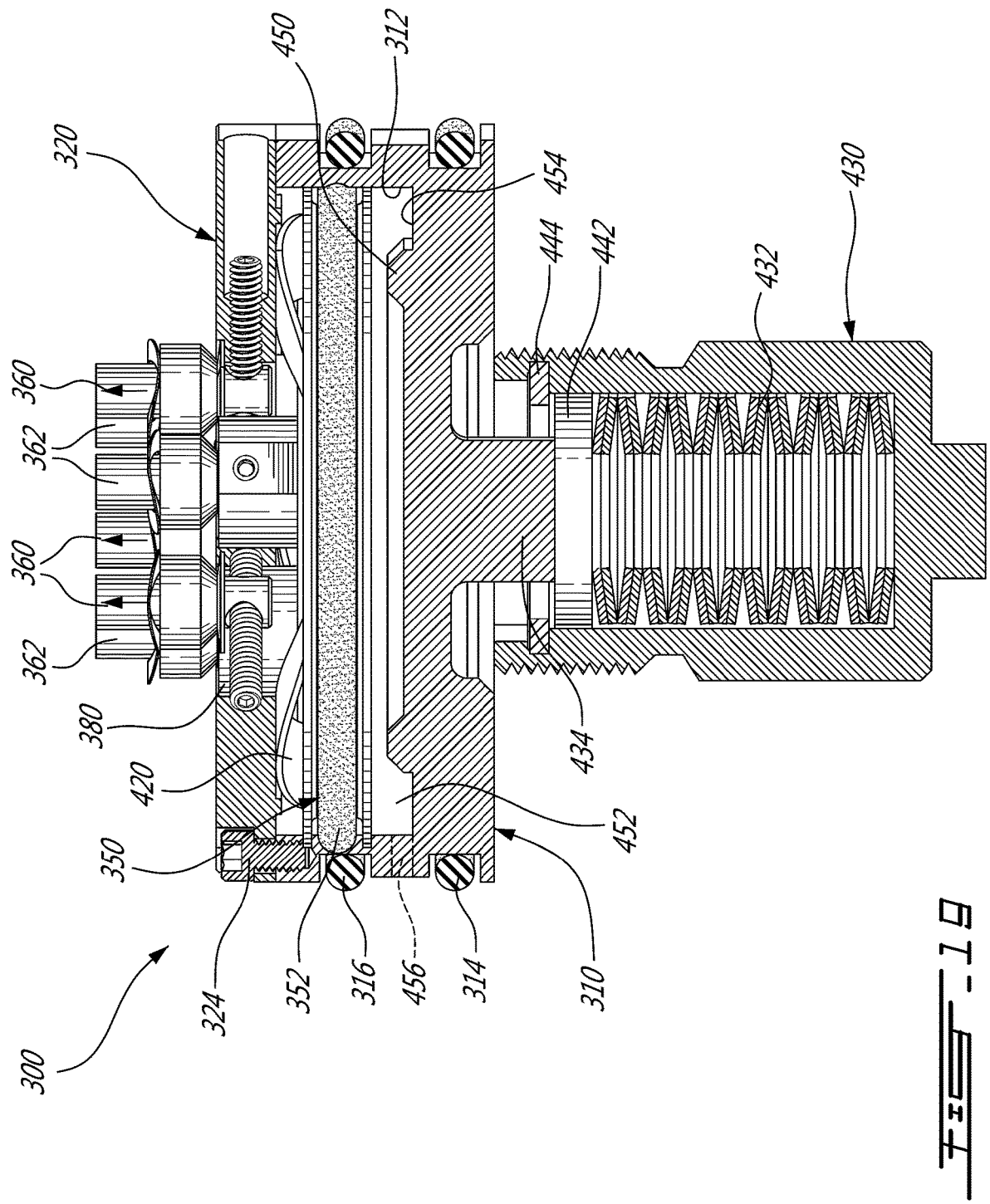
FIG. 19 corresponds to what is shown in FIG. 18 after the pressure decreased so as to move the first piston back to its upper position.

FIG. 19 corresponds to what is shown in FIG. 18 after the pressure decreased so as to move the first piston 310 back to its upper position. The pressure falls to a level similar to that in FIG. 14 and gas can exit the inner cavity 312 through the channel 456, thereby causing the first piston 310 to move upwards. The second piston 350 stays in its upper position. All gas circuits are closed afterwards.

Figure 20:
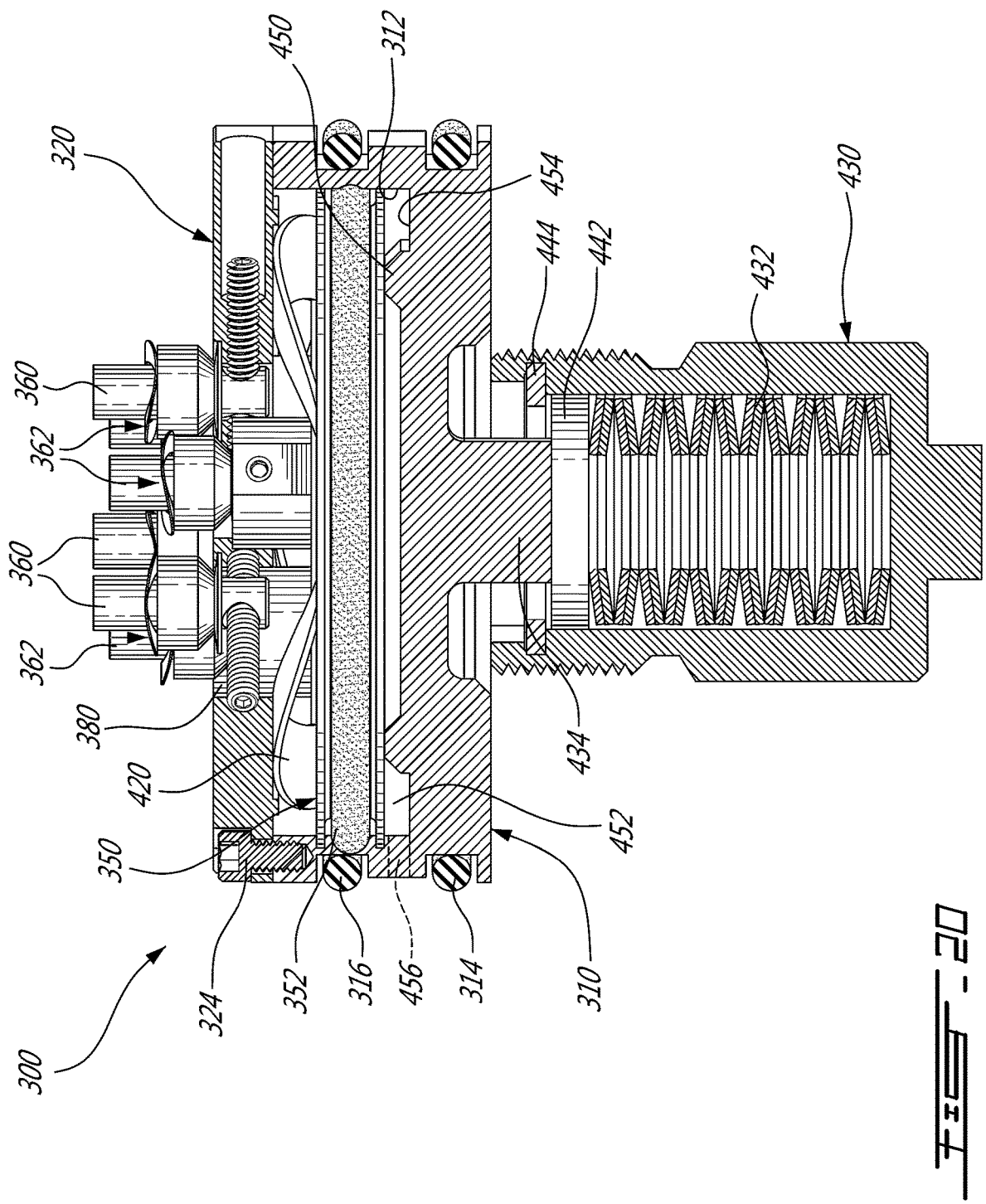
FIG. 20 corresponds what is shown in FIG. 19 after the pressure further decreased so as to move the second piston to its bottom position.

FIG. 20 corresponds what is shown in FIG. 19 after the pressure further decreased so as to move the second piston 350 to its bottom position. The spring force from the return spring 420 above the second piston 350 now overcomes the force generated by the gas pressure under the second piston 350. The second piston 350 slides downwards inside the inner cavity 312.

Figure 21:
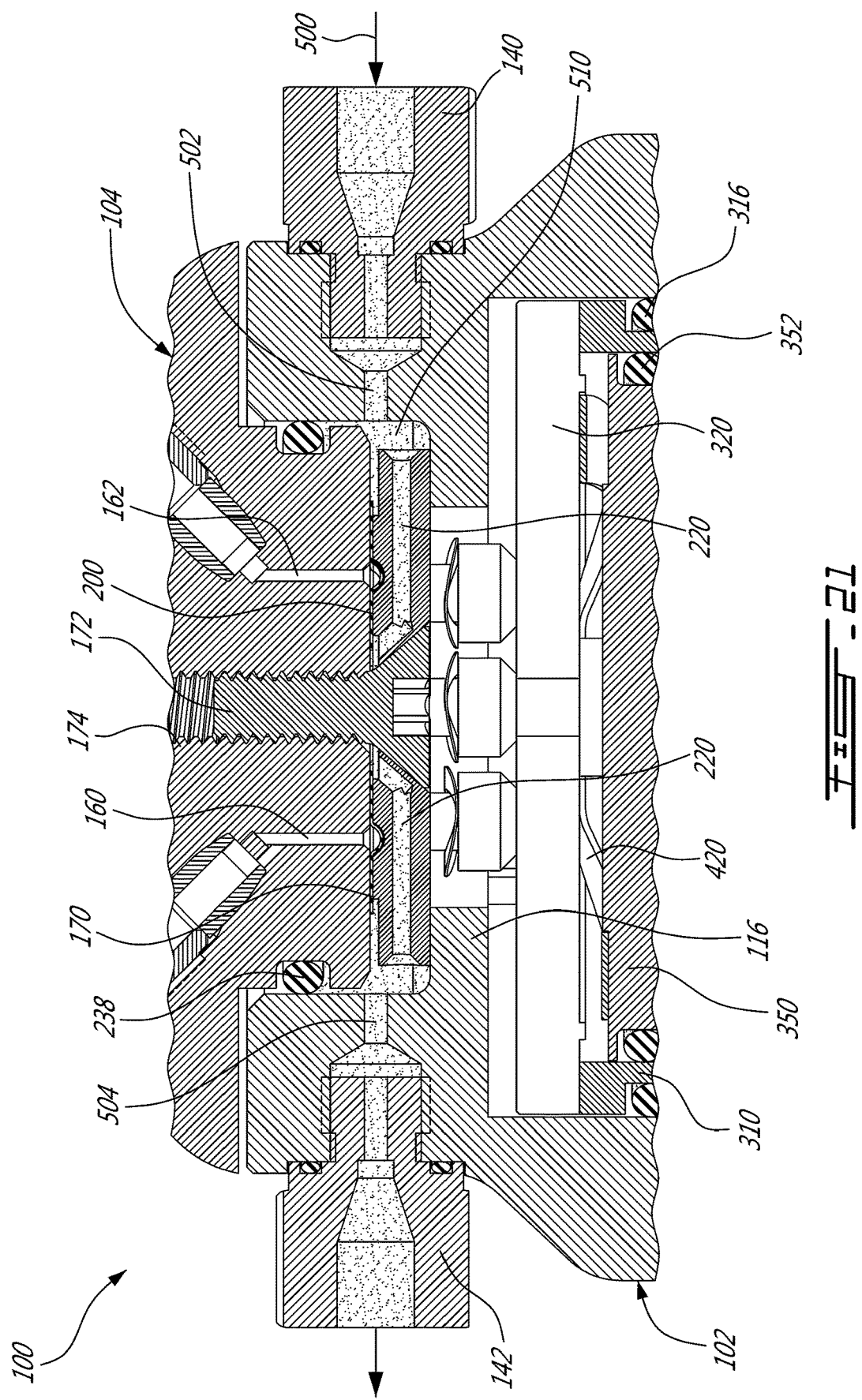
FIG. 21 is an enlarged cross section view of a portion of the valve assembly shown in FIG. 1, this view depicting an example of the purge gas path.

FIG. 21 is an enlarged cross section view of a portion of the valve assembly 100 shown in FIG. 1. It depicts an example of the purge gas circuit 500. Inert gas or gases, hereafter generically referred to as the purge gas, is sent through the purge gas circuit 500 to prevent contaminants from accumulating in areas around the sealing diaphragm 200, thereby mitigating the risks of contaminating the highly pure environment on the upper side of the sealing diaphragm 200. In some instances, the purge gas circuit 500 can be useful to prevent gas built-up at the center of the sealing diaphragm 200. Some light gases are prone to permeate through the sealing diaphragm 200. The presence of these gases is generally undesirable and the purge gas circuit 500 can flush them out of the valve assembly 100 if this required.

The purge gas enters the purge gas circuit 500 inside the valve assembly 100 of the example through the gas port 140 (FIG. 1). It flows into a channel 502 passing through the sidewall of the main valve body 102. It then reaches an annular vented space 510 generally located around the peripheral outer surface of the support plate 170. The central area of the sealing diaphragm 200 can be vented using the channels 220 inside the support plate 170. The purge gas can exit through another channel 504 made through the sidewall of the main valve body 102, as shown in the illustrated example. Other configurations and arrangements are possible.

Overall, with the proposed design, the risks of damaging the sealing diaphragm 200 due to an overpressure are mitigated. The integrity of the gas circuits inside the valve assembly 100 is also preserved during a maintenance operation.

The present detailed description and the appended figures are meant to be exemplary only. A skilled person will recognize that variants can be made in light of a review of the present disclosure without departing from the proposed concept. Among other things, and unless otherwise explicitly specified, none of the parts, elements, characteristics or features, or any combination thereof, should be interpreted as being necessarily essential to the invention simply because of their presence in one or more examples described, shown and/or suggested herein.

LIST OF REFERENCE NUMERALS 100 valve assembly
102 main valve body
104 upper valve head
108 central axis
110 housing
112 bottom cover
114 annular base
116 internal flange (in main valve body)
120 bolt
122 recess (in the upper valve head)
130 gas port
131 gas port
132 gas port
133 gas port
134 gas port
135 gas port
136 ferrule
140 gas port
142 gas port
150 gas port
152 actuating gas circuit
160 conduit
162 conduit
164 inner end (of conduit 162)
170 support plate
172 screw
174 threaded hole (on upper valve head)
176 conical surface (under support plate)
180 inner cavity (of main valve body)
182 bolt
184 bottom section (of the bottom cover)
186 bolt (of annular base)
190 dowel 192 bore hole (in main valve body)
194 bore hole (in upper valve head)
200 sealing diaphragm
202 central hole (on diaphragm)
204 embossed section (on diaphragm)
210 central hole (on support plate)
212 surface groove
214 hole (on support plate)
220 channel (for purge gas inside support plate)
222 opening (inner end of the channel 220)
232 alignment hole (on support plate)
234 dowel
238 gasket (on upper valve head)
240 planar bottom surface (on upper valve head)
242 conical surface (on upper valve head)
250 planar upper surface (on support plate)
250A inner annular section
250B outer annular section
252 outer peripheral surface
254 annular surface
260 gasket
262 planar mating surface (on main valve body)
264 planar mating surface (on upper valve head)
300 actuating unit
310 first piston
312 inner cavity (first piston)
314 gasket (first piston)
316 gasket (first piston)
320 perforated plate
322 upper rim surface
324 screw (for perforated plate)
326 hole (on the perforated plate)
328 threaded hole (on first piston)
350 second piston
352 gasket (on second piston)
354 bottom surface (on section piston)
360 plunger (normally closed)
362 plunger (normally opened)
370 seat (for plunger 360)
372 through-hole
374 fastener
376 channel opening
380 seat (for plunger 362)
382 opening
384 hole
386 transversal hole
388 fastener
390 base portion (of plunger 360)
392 upper portion (of plunger 360)
394 bottom portion (of plunger 360)
396 through-hole (of plunger 360)
398 central cavity (tip on plunger 360)
400 base portion (of plunger 362)
402 upper portion (of plunger 362)
404 bottom portion (of plunger 362)
406 through-hole (of plunger 362)
408 central cavity (tip on plunger 362)
410 washer
412 washer
414 spring member
416 spring member
420 return spring
430 spring pack unit
432 Belleville spring stack
434 cylindrical member
436 bottom cavity
440 casing
442 flat washer
444 circlip
446 retaining groove
448 bottom member
450 annular section
452 space
454 bottom surface
456 channel
460 channel
500 purge gas circuit
502 channel
504 channel
510 annular space

What is claimed is:

1. A valve assembly for a gas chromatograph, the valve assembly including:
a main valve body defining a first inner cylindrical cavity coaxially disposed with reference to a central axis;
a support plate positioned above the main valve body and including a planar upper surface that is generally normal to the central axis, the planar upper surface having a surface groove circumferentially-disposed about the central axis and an array of holes extending generally parallel to the central axis across the support plate;
an upper valve head positioned above the support plate, the upper valve head including a bottom planar bottom surface and a plurality of discrete conduits, each conduit extending between an outer end and an inner end;
a sealing diaphragm interposed between the planar upper surface of the support plate and the planar bottom surface of the upper valve head;
a first piston positioned inside the first inner cavity to reciprocate, along the central axis and relative to the sealing diaphragm, between at least a bottom position and an upper position, the first piston having a body defining a second inner cylindrical cavity;
a second piston positioned inside the second inner cavity of the first piston to reciprocate, along the central axis and relative to the sealing diaphragm, between at least a bottom position and an upper position;
a set of normally-closed plungers and a set of normally-opened plungers that are generally extending parallel to the central axis and disposed in a staggered arrangement, the normally-closed plungers being carried by the first piston and the normally-opened plungers being carried by the second piston;
an actuating gas circuit extending through the body of the first piston to establish a fluid communication with a space located between a bottom surface of the second inner cavity and the second piston;
a first force-generating mechanism to urge the first piston towards its upper position; and
a second force-generating mechanism to urge the second piston towards its bottom position.

2. The valve assembly as defined in claim 1, wherein the holes of the support plate are axisymmetric and are in registry with the surface groove.

3. The valve assembly as defined in claim 2, wherein the inner end of each conduit is located on the planar bottom surface and is in registry with the surface groove at a corresponding intermediate position that is substantially halfway between two adjacent ones of the holes on the support plate.

4. The valve assembly as defined in claim 1, wherein the second inner cavity is coaxially disposed with reference to the central axis.

5. The valve assembly as defined in claim 1, wherein each normally-closed plunger has an upper portion, slidably mounted inside a corresponding one of the holes of the support plate, with an upper end engaging the sealing diaphragm when the first piston is in the upper position and that is out of engagement with the sealing diaphragm when the first piston is in the bottom position, each normally-opened plunger having an upper portion, slidably mounted inside a corresponding one of the holes of the support plate, with an upper end engaging the sealing diaphragm when the second piston is in the upper position and that is out of engagement with the sealing diaphragm when the second piston is in the bottom position.

6. The valve assembly as defined in claim 1, further including a mechanical fastener disposed to removably affix the support plate underneath the upper valve head, the fastener being generally coaxial with the central axis.

7. The valve assembly as defined in claim 6, wherein the mechanical fastener of the support plate includes a screw engaged into a threaded hole provided underneath the upper valve head.

8. The valve assembly as defined in claim 1, wherein the first force-generating mechanism includes a spring pack unit positioned between a bottom side of the first piston and the main valve body.

9. The valve assembly as defined in claim 8, wherein the spring pack unit is adjustable in position along the central axis.

10. The valve assembly as defined in claim 1, wherein the first force-generating mechanism includes at least one Belleville spring.

11. The valve assembly as defined in claim 1, wherein the second force-generating mechanism is located inside the second inner cavity.

12. The valve assembly as defined in claim 11, wherein the second force-generating mechanism is located between a bottom side of a perforated plate that is affixed to an upper side of the first piston, and an upper side of the second piston.

13. The valve assembly as defined in claim 1, wherein the second force-generating mechanism includes a wave disc.

14. The valve assembly as defined in claim 1, wherein the first piston engages a sidewall of the first inner cavity using a pair of vertically spaced-apart gaskets mounted in corresponding outer grooves around the first piston.

15. The valve assembly as defined in claim 14, wherein the actuating gas circuit passes through the main valve body and is in fluid communication with an intervening space located between the sidewall of the first inner cavity, a sidewall of the body of the first piston and the two spaced-apart gaskets, at least one channel extending across the sidewall of the body of the first piston to establish a fluid communication between the second inner cavity and the actuating gas circuit.

16. The valve assembly as defined in claim 15, wherein the valve assembly includes at least one of the following features:
at least one channel leads to the space located between the bottom surface of the second inner cavity and the bottom side of the second piston;
the space is annular and is surrounded by a generally annular section projecting upwardly inside the second inner cavity.

17. The valve assembly as defined in claim 1, wherein the valve assembly includes at least one of the following features:
the support plate has a circular cross section, the surface groove extending uninterruptedly on the support plate;
at least some of the plungers include a central cavity at an upper tip end;
the main valve body includes a housing to which is affixed a bottom cover, the first inner cavity being provided inside the housing.

18. The valve assembly as defined in claim 1, wherein the normally-closed plungers are mounted on a perforated plate affixed to the first piston and encasing the second piston inside the second inner cavity.

19. The valve assembly as defined in claim 1, further including a purge gas circuit passing at least around the support plate.

20. The valve assembly as defined in claim 19, wherein the support plate includes at least two spaced-apart and radially-extending channels, at least a portion of the purge gas circuit passing inside the channels of the support plate to vent a central area of the sealing diaphragm.

* * * * *